(12) United States Patent
Meyers et al.

(10) Patent No.: US 8,594,455 B2
(45) Date of Patent: Nov. 26, 2013

(54) SYSTEM AND METHOD FOR IMAGE ENHANCEMENT AND IMPROVEMENT

(71) Applicant: U.S. Army Research Laboratory ATTN: RDRL-LOC-I, Adelphi, MD (US)

(72) Inventors: Ronald E. Meyers, Columbia, MD (US); Keith S. Deacon, Columbia, MD (US)

(73) Assignee: The United States of America as represented by the Secretary of the Army, Washington, DC (US)

( * ) Notice: Subject to any disclaimer, the term of this patent is extended or adjusted under 35 U.S.C. 154(b) by 0 days.

(21) Appl. No.: 13/838,249

(22) Filed: Mar. 15, 2013

(65) Prior Publication Data

US 2013/0243334 A1    Sep. 19, 2013

Related U.S. Application Data

(63) Continuation-in-part of application No. 13/247,470, filed on Sep. 28, 2011, now Pat. No. 8,532,427.

(51) Int. Cl.
G06K 9/38    (2006.01)
G06K 9/40    (2006.01)

(52) U.S. Cl.
USPC .......................................... 382/274; 382/272

(58) Field of Classification Search
None
See application file for complete search history.

(56) References Cited

U.S. PATENT DOCUMENTS 4,875,165 A  * 10/1989 Fencil et al. ................. 345/424
6,122,316 A  *  9/2000 Varanasi et al. .......... 375/240.12
7,061,528 B1 *  6/2006 Honma ....................... 348/222.1
7,536,012 B1    5/2009 Meyers et al.
7,812,303 B2   10/2010 Meyers et al.
8,053,715 B2   11/2011 Meyers et al.
8,242,428 B2    8/2012 Meyers et al.
2005/0197977 A1 *  9/2005 Buck et al. ...................... 706/12

(Continued)

OTHER PUBLICATIONS

Chan, Kam Wai C., Malcolm N. O'Sullivan, and Robert W. Boyd. "Optimization of thermal ghost imaging: high-order correlations vs. background subtraction."Optics express 18.6 (2010): 5562-5573.*

(Continued)

*Primary Examiner* — Michelle Entezari
(74) *Attorney, Agent, or Firm* — Lawrence E. Anderson

(57) ABSTRACT

A method and system for improving picture quality of images by providing a series of frames of a given region of interest. One embodiment for a method includes: determining the value of each pixel at each location within each frame to form a first array of pixel values for each frame; determining the overall intensity of each frame; determining the product of the overall intensity and the array of pixel values for each frame; determining the sum of the products by adding together the products of the overall frame intensity and first array of pixel values for each frame; determining the average of the sum of products by dividing the sum of products by the number of frames in the series of frames; determining the average value of each pixel at each pixel location for the series of frames to form a second array of average pixel values; determining the average overall frame intensity for the series of frames; determining a second product of the second array of average pixel values and the average overall frame intensity; subtracting the second product from the first product to provide an improved image of the region of interest. Other improvement embodiments are also disclosed.

20 Claims, 30 Drawing Sheets

(56) References Cited

U.S. PATENT DOCUMENTS

| | | | |
|---|---|---|---|
| 2006/0112628 A1* | 6/2006 | Kotyk et al. | 47/58.1 SE |
| 2006/0262971 A1* | 11/2006 | Foes et al. | 382/141 |
| 2007/0057211 A1* | 3/2007 | Bahlman et al. | 250/584 |
| 2011/0293259 A1* | 12/2011 | Doepke et al. | 396/236 |
| 2012/0229668 A1 | 9/2012 | Meyers | |

OTHER PUBLICATIONS

Shapiro, Jeffrey H. "Computational ghost imaging." Physical Review A 78.6 (2008): 061802.*

Paek, Eung G., and Demetri Psaltis. "Optical associative memory using Fourier transform holograms." Optical Engineering 26.5 (1987): 265428-265428.*

Cheng, Jing. "Ghost imaging through turbulent atmosphere." Optics express 17.10 (2009): 7916-7921.*

R. Meyers, K. Deacon, and Y. Shih, 'Ghost-imaging experiment by measuring reflected photons,' Phys. Rev. A 77, 041801(R) (2008).

D. L. Donoho, "Compressed sensing," IEEE Transactions on Information Theory, vol. 52, pp. 1289-1306, 2006.

E. Candes, J. Romberg, and T. Tao, "Robust uncertainty principles: Exact signal Reconstruction from Highly Incomplete Frequency Information," IEEE Trans. Inf. Theory, 52, 489 (2006).

Giuliano Scarcelli, et al. "Can Two-Photon Correlation of Chaotic Light Be Considered as Correlation of Intensity Fluctuations?" Physics Review Letters 96, 063602 (2006).

O. Katz, Y. Bromberg, Y. Silberberg, "Compressive Ghost Imaging," Appl Phys. Lett., 95, 131110 (2009).

J. Shapiro, "Computational ghost imaging," Phys. Rev. A vol. 78 061802(R) (Dec. 18, 2008).

R. Meyers and K. Deacon, "Quantum Ghost Imaging Experiments At ARL", Proc. SPIE vol. 7815, 78150I, (2010).

M. Figueiredo, R. Nowak, and S. Wright, "Gradient projection for sparse reconstruction: Application to compressed sensing and other inverse problems (2007)," IEEE J. Sel. Topics on Signal Processing, 1, 586 (2007).

R. Meyers, K. Deacon, and Y.Shih, "A new Two-photon Ghost Imaging Experiment with Distortion Study," J. Mod. Opt., 54, 2381-2392 (2007).

R. Meyers, K. Deacon, and Y. Shih, "Quantum imaging of an obscured object by measurement of reflected photons," Proc. SPIE vol. 7092, 70920E (2008) doi:10.1117/12.797926.

R. Meyers, K. Deacon, and Y. Shih, "Turbulence-free ghost imaging," Appl. Phys. Lett. 98, 111115 (Mar. 18, 2011); do1:10.1063/1.3567931.

R. Glauber, "The Quantum Theory of Optical Coherence," Phys. Rev. 130, 2529 (1963) 131, 2766 (Jun. 1963).

T. B. Pittman, et al. "Optical imaging by means of two-photon quantum entanglement," Phys. Rev. A 52, R3429-R3432 (1995).

D. Strekalov, et al. "Observation of Two-Photon 'Ghost' Interference and Diffraction," Phys. Rev. Lett. 74, 3600-3603 (1995).

R. Meyers, K. Deacon, Y. Shih, "Positive-negative turbulence-free ghost imaging," Appl. Phys. Lett. 100, 131114 (Mar. 29, 2012).

R. Meyers, K. Deacon, A. Tunick, Y. Shih, "Positive-negative turbulence-free ghost imaging experiments," Proc. SPIE 8518 85180X-1 (2012).

* cited by examiner

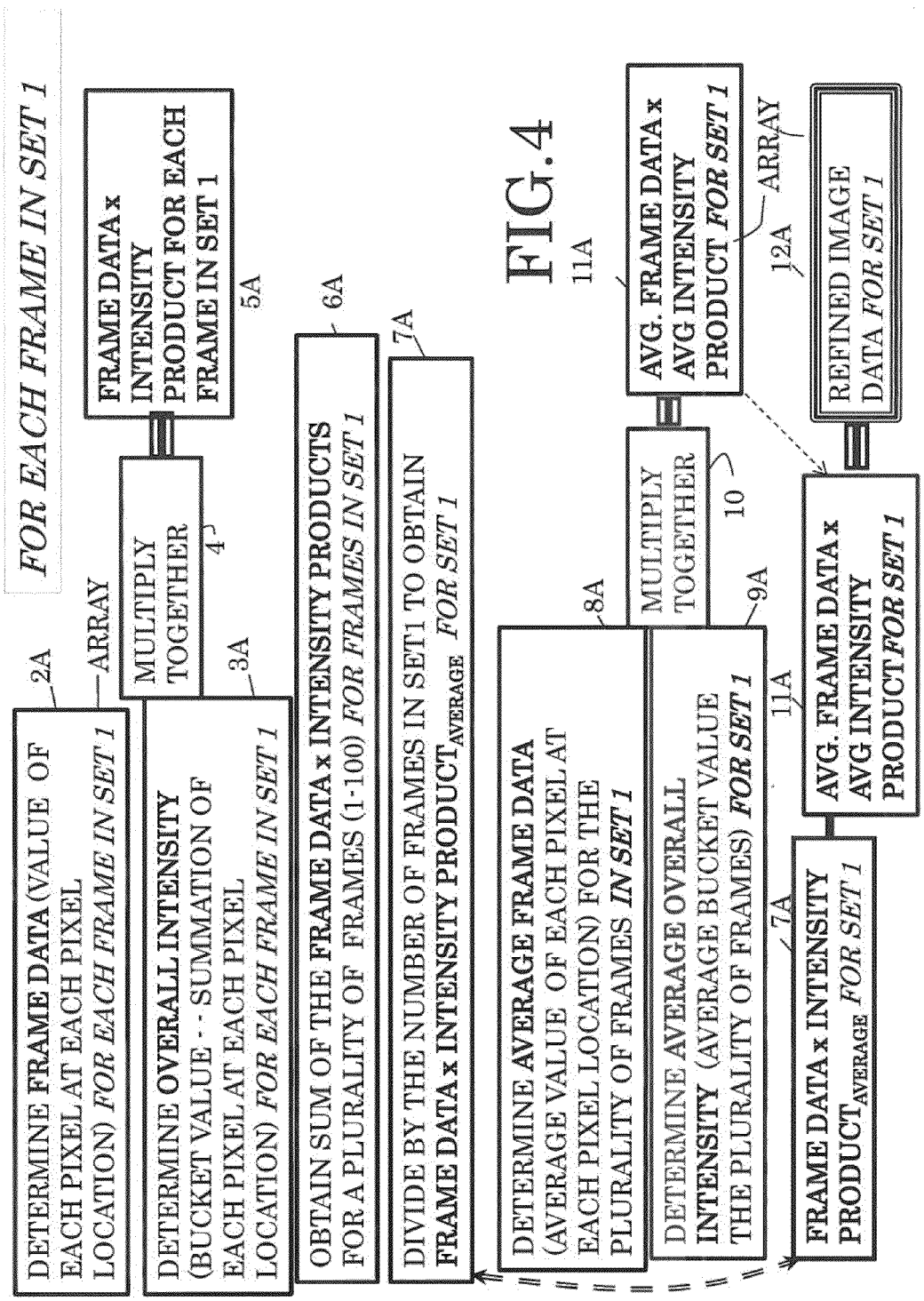

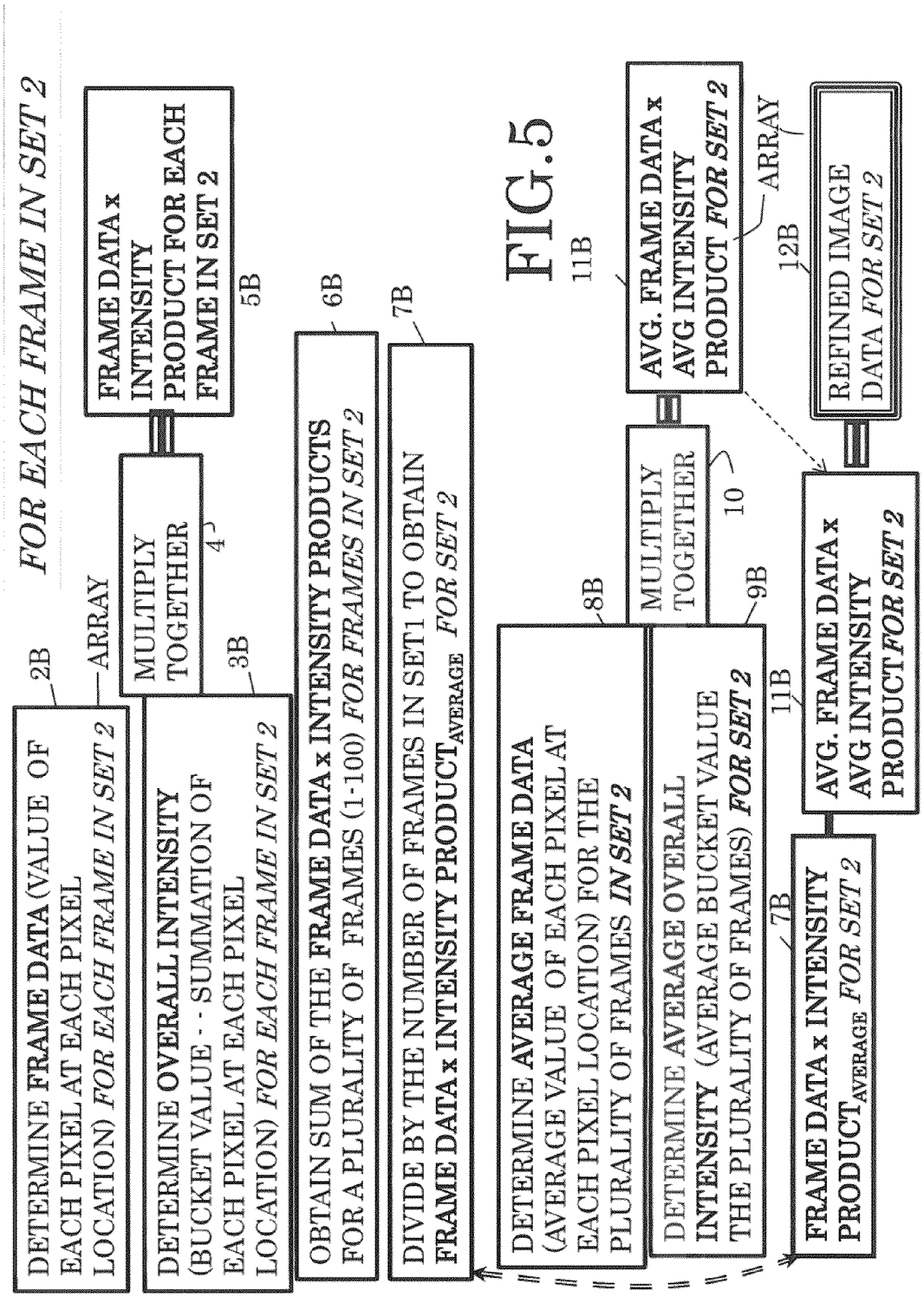

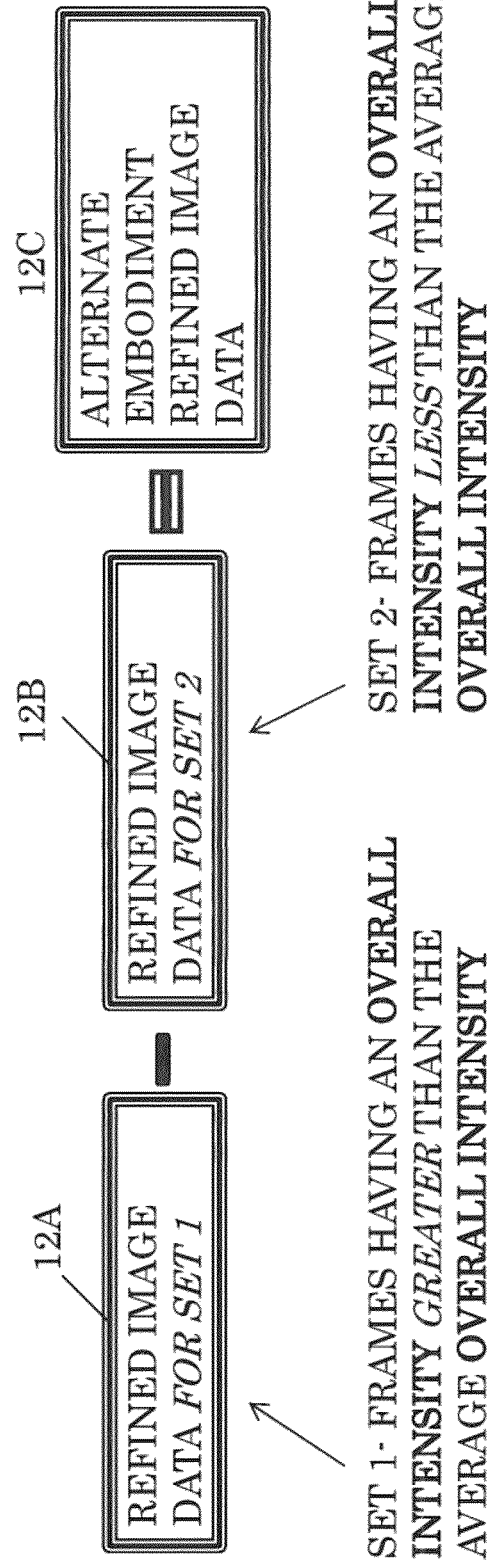

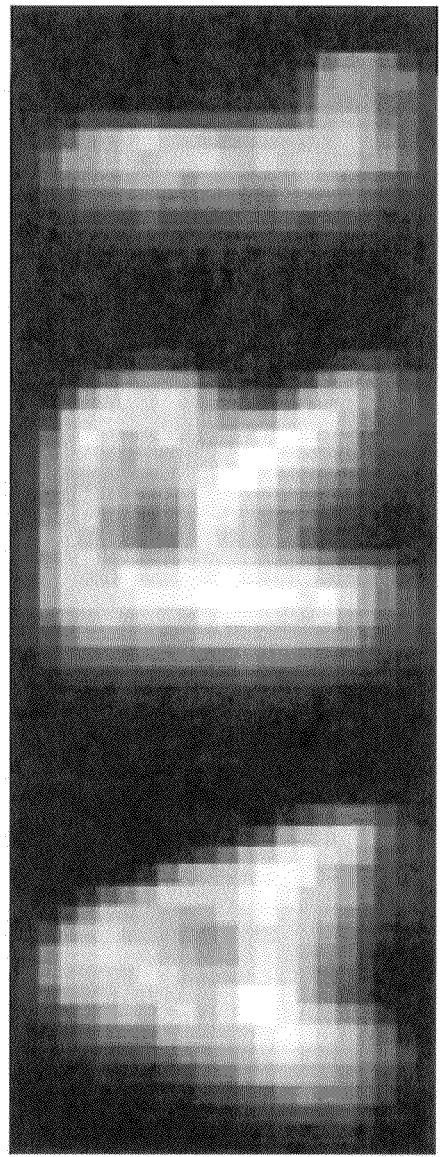
FIG. 7 Self Bucket $G^{(2)}$ Virtual Ghost Image with turbulence10k Frames.
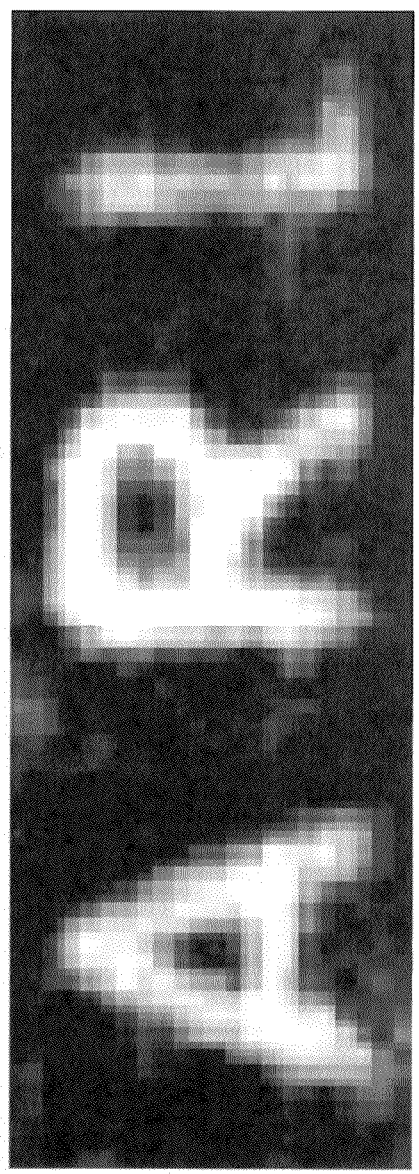
FIG. 8 $G^{(2)}$ Ghost image computed using the 2 path configuration.

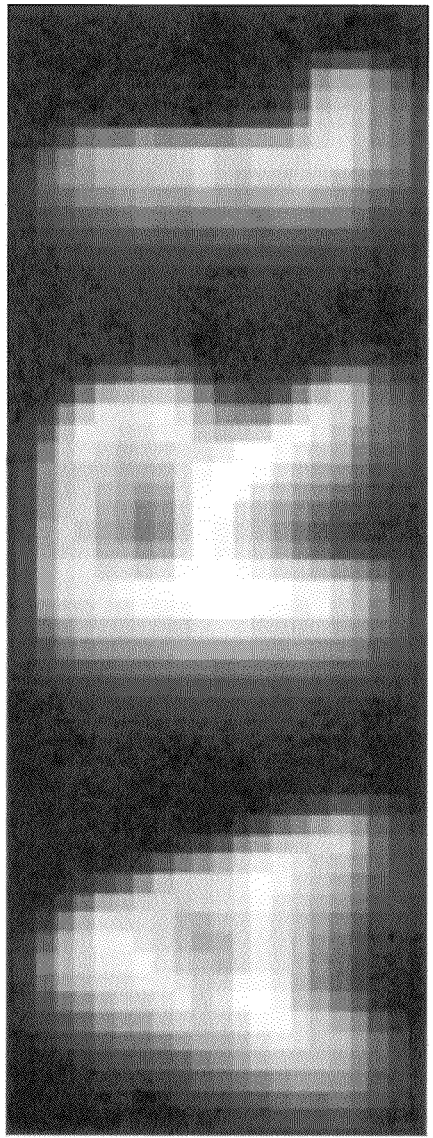
FIG. 9  Mean Bucket/Target Image 10k Frames.
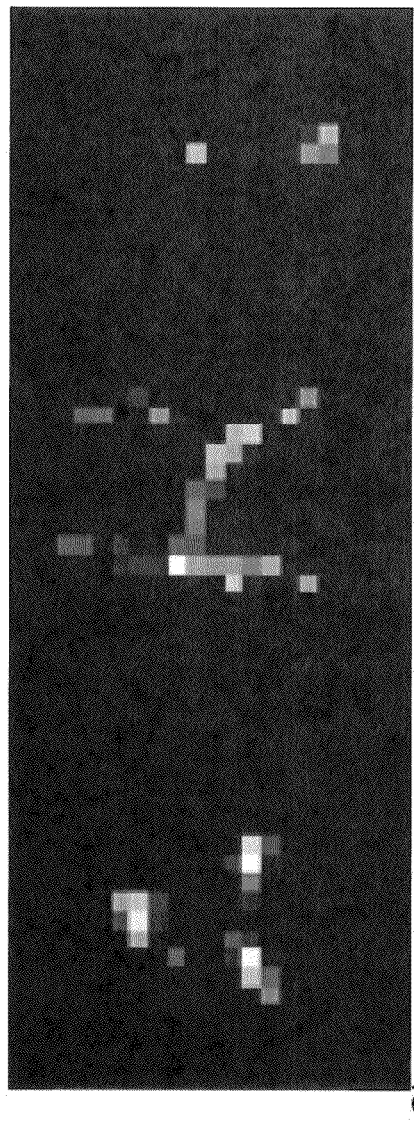
FIG. 10  Self Bucket G(2) GPSR with turbulence 10k Frames; Data normalized globally 0-1; τ=1e8; Tol=1e-6; Non Zero=67

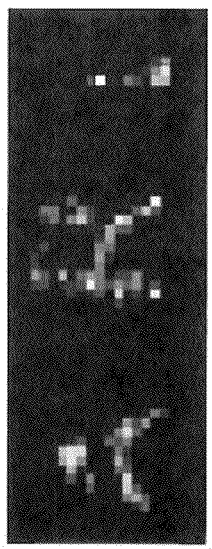
FIG. 11 Self Bucket G(2) GPSR with turbulence 10k Frames; Data normalized globally
0-1; tau=5e7; Tol=1e-6; Non Zero=131
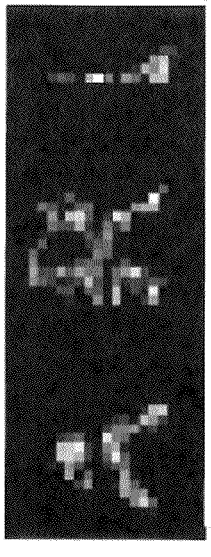
FIG. 12 Self Bucket G(2) GPSR with turbulence 10k Frames;Data normalized globally
0-1; tau=2.5e7; Tol=1e-6; NonZero=183
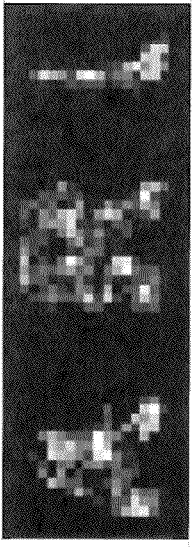
FIG. 13 Self Bucket G(2) GPSR with turbulence 10k Frames; Data normalized globally
0-1; tau=1e7; Tol=1e-6; Non Zero=304

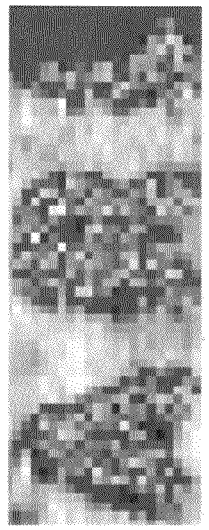
FIG. 14 Self Bucket $G^{(2)}$ GPSR with turbulence 10k Frames; Data normalized globally 0-1; tau =1e6; Tol=1e-6; Non Zero=1310
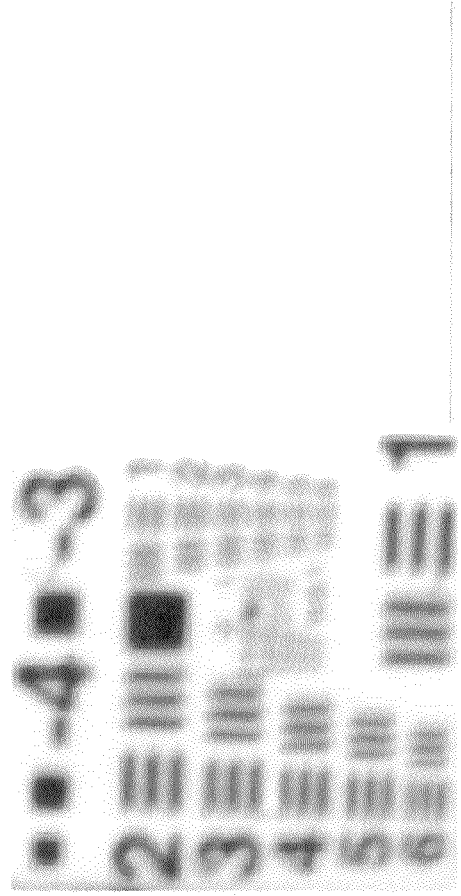
FIG. 15 Sample instantaneous data image. Frame = 137

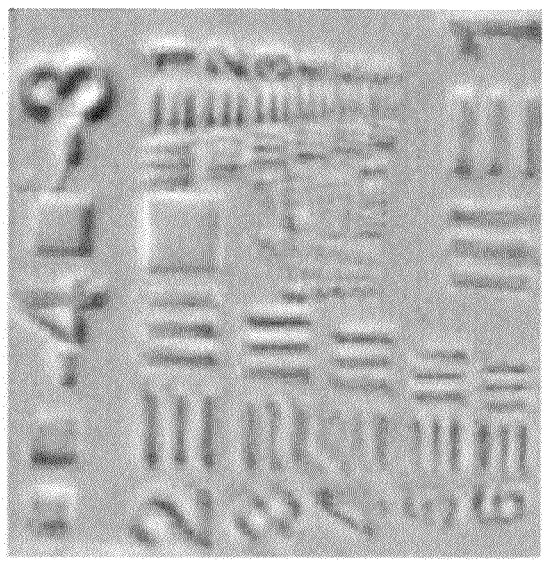
FIG. 17 Frame Self Bucket G(2) frames, 100m distance through turbulence.
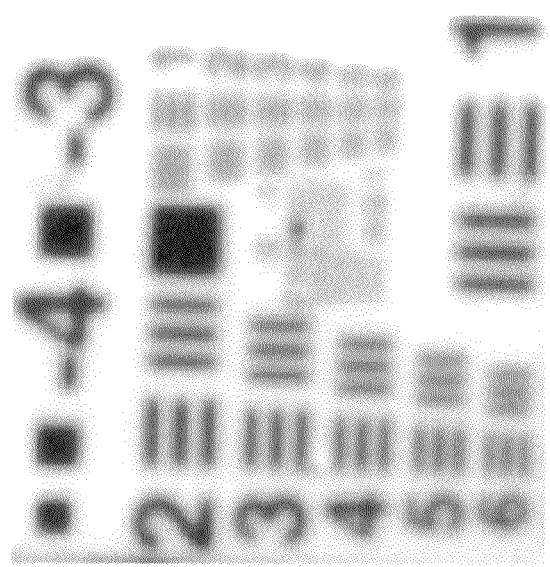
FIG. 16 Average of 335 frames

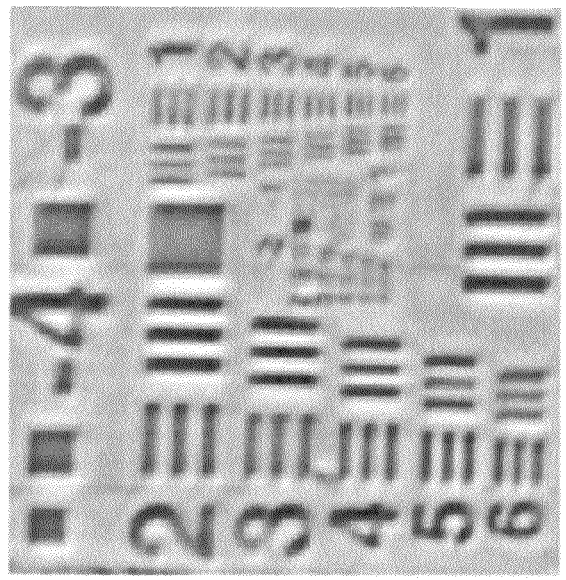
FIG. 18  335 Frame Self Bucket G(2), 100m distance through turbulence.

INPUT A SERIES OF FRAMES (e.g., 1-100) OF A GIVEN SCENE, SUCH AS FOR EXAMPLE, PHOTOGRAPHY THAT WAS INFLUENCED BY THE EFFECTS OF TURBULENCE OR THE LIKE /315

DETERMINE AVERAGE FRAME DATA (AVERAGE VALUE OF EACH PIXEL AT EACH PIXEL LOCATION) FOR THE PLURALITY OF FRAMES /316

DETERMINE THE DEVIATION FRAME DATA DEVIATION FOR EACH FRAME BY SUBTRACTING THE AVERAGE FRAME DATA FROM THE FRAME DATA FOR EACH FRAME /317

FIG. 21

SET 3 — 318

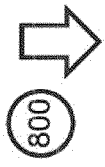

FOR EACH FRAME WITH A POSITIVE OVERALL INTENSITY DEVIATION MULTIPLY THE POSITIVE OVERALL INTENSITY DEVIATION BY THE POSITIVE DEVIATION FRAME DATA PIXELS WITHIN THAT SET OF FRAMES

— 319

RECORD AND ACCUMULATE PIXEL LOCATIONS(a), THE SQUARE OF THE POSITIVE OVERALL INTENSITY DEVIATION VALUES(b), THE PRODUCT OF THE POSITIVE OVERALL INTENSITY DEVIATION × POSITIVE DEVIAITON FRAME DATA PIXELS (c) AND THE SQUARE OF THE POSITIVE DEVIATION FRAME DATA PIXELS (d) VALUES THAT WERE USED AT A PIXEL LOCATION.

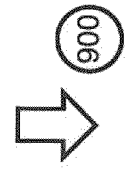

DETERMINE THE PRE-NORMALIZED POSITIVE POSITIVE-PRODUCT PIXEL VALUES BY DIVIDING THE PRODUCT OF THE POSITIVE OVERALL INTENSITY DEVIATION × POSITIVE DEVIATION FRAME DATA PIXELS BY THE ACCUMULATED PIXEL LOCATIONS (a)

DETERMINE THE AVERAGE THE SQUARES OF THE POSITIVE OVERALL INTENSITY DEVIATION VALUES BY DIVIDING THE ACCUMULATED SQUARES OF THE POSITIVE OVERALL INTENSITY DEVIATION VALUES BY THE ACCUMULATED PIXEL LOCATIONS (b)

DETERMINE THE AVERAGE THE SQUARES OF THE POSITIVE DEVIATION FRAME DATA PIXELS BY DIVIDING THE ACCUMULATED SQUARES OF THE POSITIVE DEVIATION FRAME DATA PIXEL VALUES BY THE ACCUMULATED PIXEL LOCATIONS (c)

*SET 4*

400 ⟶ FOR EACH FRAME WITH A NEGATIVE OVERALL INTENSITY DEVIATION MULTIPLY THE NEGATIVE OVERALL INTENSITY DEVIATION BY THE NEGATIVE DEVIATION FRAME DATA PIXELS WITHIN THAT SET OF FRAMES

401 ⟶ RECORD AND ACCUMULATE PIXEL LOCATIONS(a), THE SQUARE OF THE NEGATIVE OVERALL INTENSITY DEVIATION VALUES(b), THE PRODUCT OF THE NEGATIVE OVERALL INTENSITY DEVIATION x NEGATIVE DEVIATION FRAME DATA PIXELS(c) AND THE SQUARE OF THE NEGATIVE DEVIATION FRAME DATA PIXELS (d) VALUES THAT WERE USED AT A PIXEL LOCATION.

402 ⟶ DETERMINE THE PRE-NORMALIZED NEGATIVE-NEGATIVE PRODUCT PIXEL VALUES BY DIVIDING THE PRODUCT OF THE NEGATIVE OVERALL INTENSITY DEVIATION x NEGATIVE DEVIATION FRAME DATA PIXELS BY THE ACCUMULATED PIXEL LOCATIONS (a)
DETERMINE THE AVERAGE THE SQUARES OF THE NEGATIVE OVERALL INTENSITY DEVIATION VALUES BY DIVIDING THE ACCUMULATED SQUARES OF THE NEGATIVE OVERALL INTENSITY DEVIATION VALUES BY THE ACCUMULATED PIXEL LOCATIONS (b)
DETERMINE THE AVERAGE THE SQUARES OF THE NEGATIVE FRAME DATA DEVIATION PIXELS BY DIVIDING THE ACCUMULATED SQUARES OF THE NEGATIVE DEVIATION FRAME DATA PIXELS VALUES BY THE ACCUMULATED PIXEL LOCATIONS (c)

*SET 4*

403 — DETERMINE THE STANDARD DEVIATION OF THE NEGATIVE OVERALL INTENSITY DEVIATION VALUES BY TAKING SQUARE ROOT OF THE AVERAGE THE SQUARES OF THE NEGATIVE OVERALL INTENSITY DEVIATION VALUES

404 — DETERMINE THE STANDARD DEVIATION OF THE NEGATIVE DEVIATION FRAME DATA PIXELS BY TAKING SQUARE ROOT OF THE AVERAGE THE SQUARES OF THE NEGATIVE DEVIATION FRAME DATA PIXEL VALUES

405 — DETERMINE THE NORMALIZED NEGATIVE-NEGATIVE PRODUCT PIXEL VALUES BY DIVIDING THE PRE-NORMALIZED NEGATIVE-NEGATIVE CORRELATION BY THE PRODUCT OF THE STANDARD DEVIATION OF THE NEGATIVE OVERALL INTENSITY DEVIATION VALUES x THE STANDARD DEVIATION OF THE NEGATIVE DEVIATION FRAME DATA PIXELS

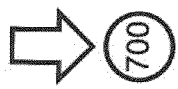

FIG. 25

(800) ⇨ SET 5

800 — FOR EACH FRAME WITH A NEGATIVE OVERALL INTENSITY DEVIATION MULTIPLY THE NEGATIVE OVERALL INTENSITY DEVIATION BY THE POSITIVE DEVIATION FRAME DATA PIXELS WITHIN THAT SET OF FRAMES

801 — RECORD AND ACCUMULATE PIXEL LOCATIONS(a), THE SQUARE OF THE NEGATIVE OVERALL INTENSITY DEVIATION VALUES(b), THE PRODUCT OF THE NEGATIVE OVERALL INTENSITY DEVIATION x POSITIVE DEVIATION FRAME DATA PIXELS(e) AND THE SQUARE OF THE POSITIVE DEVIATION FRAME DATA PIXELS (d) VALUES THAT WERE USED AT A PIXEL LOCATION.

802 — DETERMINE THE PRE-NORMALIZED POSITIVE-NEGATIVE PRODUCT PIXEL VALUES BY DIVIDING THE PRODUCT OF THE NEGATIVE OVERALL INTENSITY DEVIATION x POSITIVE FRAME DATA DEVIATION PIXELS BY THE ACCUMULATED PIXEL LOCATIONS (a)

DETERMINE THE AVERAGE THE SQUARES OF THE NEGATIVE OVERALL INTENSITY DEVIATION VALUES BY DIVIDING THE ACCUMULATED SQUARES OF THE POSITIVE OVERALL INTENSITY DEVIATION VALUES BY THE ACCUMULATED PIXEL LOCATIONS (b)

DETERMINE THE AVERAGE THE SQUARES OF THE NEGATIVE DEVIATION FRAME DATA PIXELS BY DIVIDING THE ACCUMULATED SQUARES OF THE POSITIVE DEVIATION FRAME DATA PIXELS VALUES BY THE ACCUMULATED PIXEL LOCATIONS (c)

SET 5

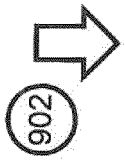

803 — DETERMINE THE STANDARD DEVIATION OF THE NEGATIVE OVERALL INTENSITY DEVIATION VALUES BY TAKING SQUARE ROOT OF THE AVERAGE THE SQUARES OF THE NEGATIVE OVERALL INTENSITY DEVIATION VALUES

804 — DETERMINE THE STANDARD DEVIATION OF THE POSITIVE DEVIATION FRAME DATA PIXELS BY TAKING SQUARE ROOT OF THE AVERAGE THE SQUARES OF THE POSITIVE DEVIATION FRAME DEVIATION PIXEL VALUE

805 — DETERMINE THE NORMALIZED POSITIVE-NEGATIVE PRODUCT PIXEL VALUES BY DIVIDING THE PRE-NORMALIZED POSITIVE-NEGATIVE CORRELATION BY THE PRODUCT OF THE STANDARD DEVIATION OF THE NEGATIVE OVERALL INTENSITY DEVIATION VALUES x THE STANDARD DEVIATION OF THE POSITIVE DEVIATION FRAME DATA PIXELS

FIG. 27

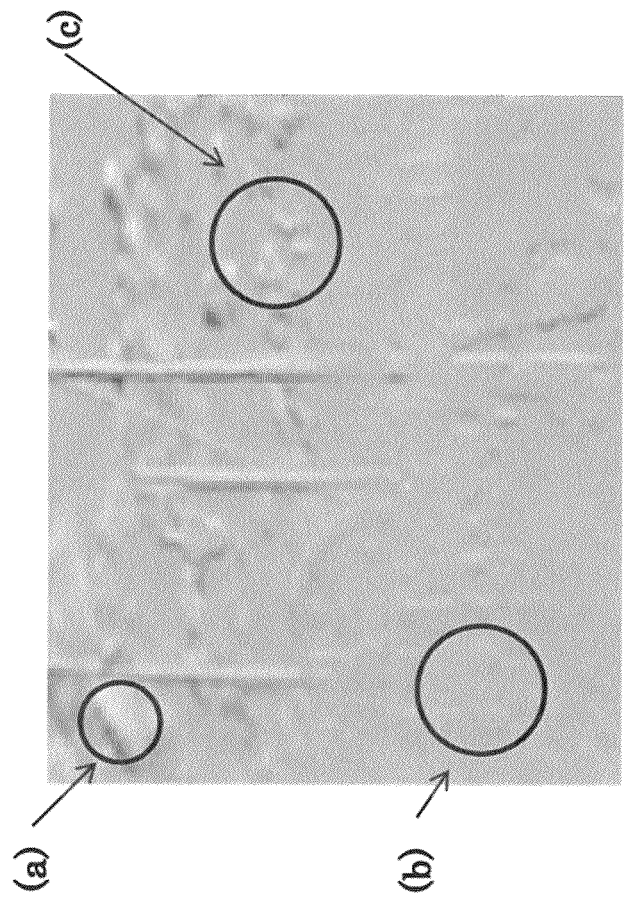
FIG 32: TYPICAL G$^{(2)}$ IMAGE RESULTS NOT IMPLEMENTING THE IMPROVEMENT METHODS

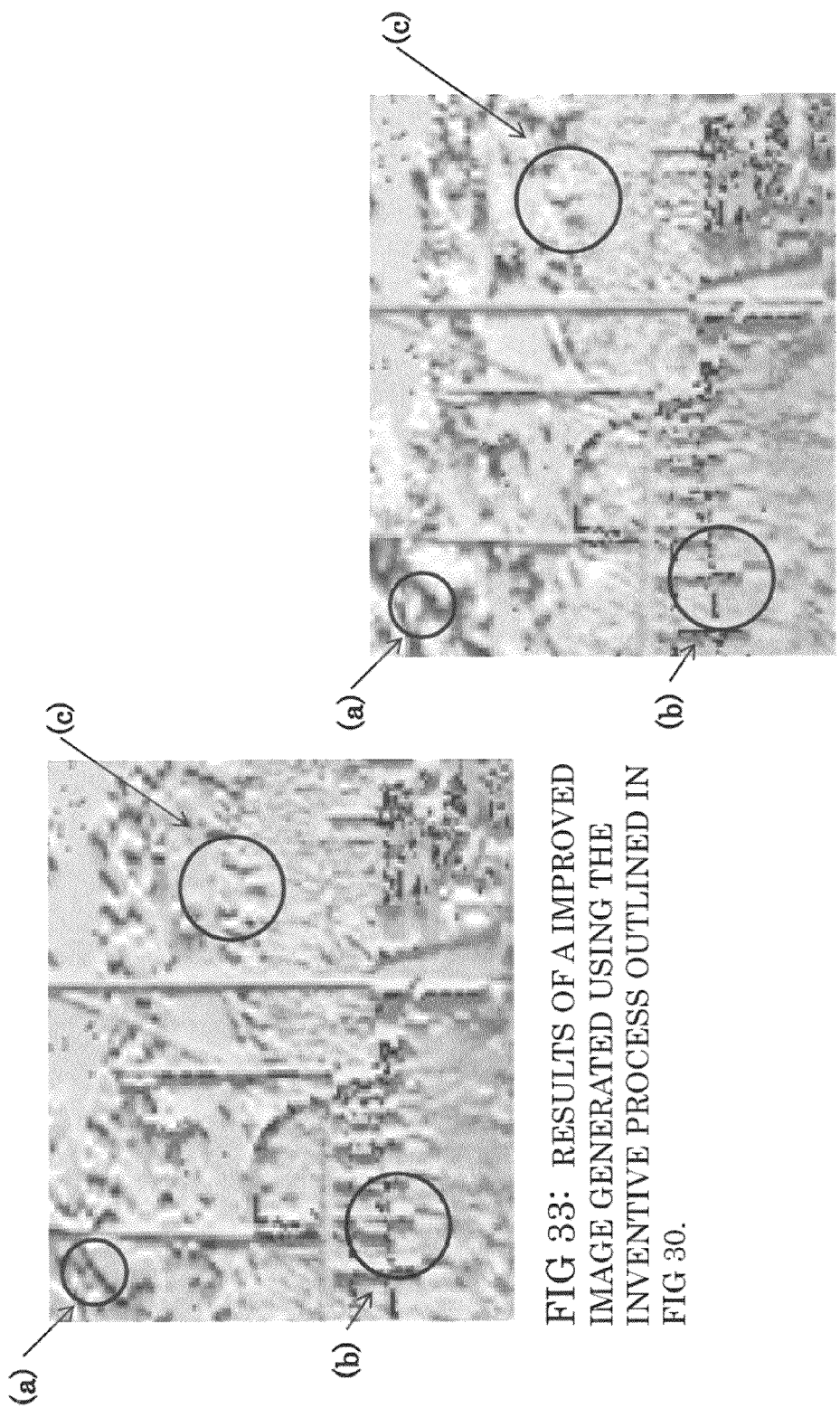

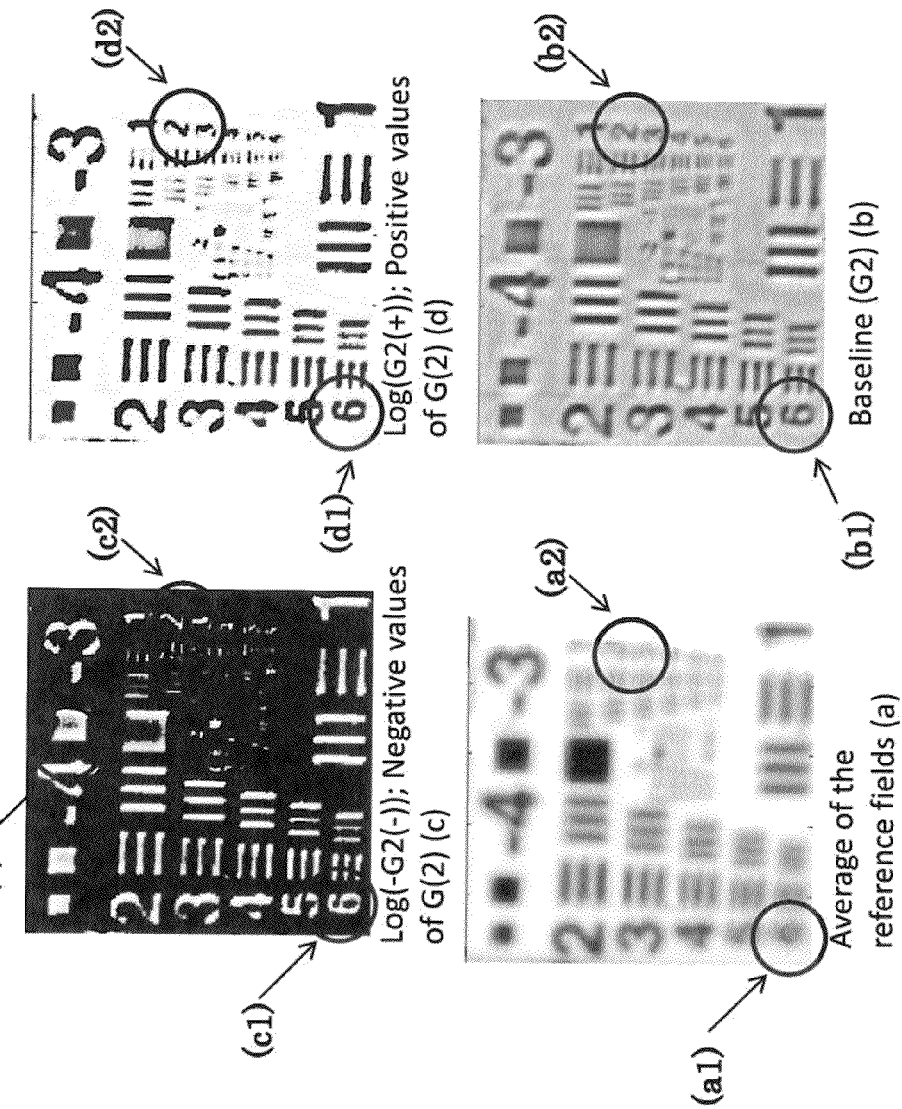

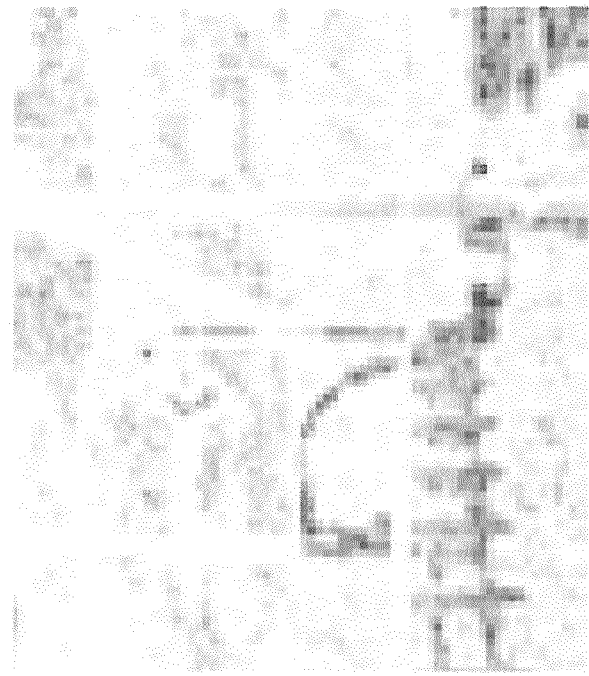
FIG 36: RESULTS OF A IMPROVED LOG IMAGE GENERATED USING THE INVENTIVE PROCESSES

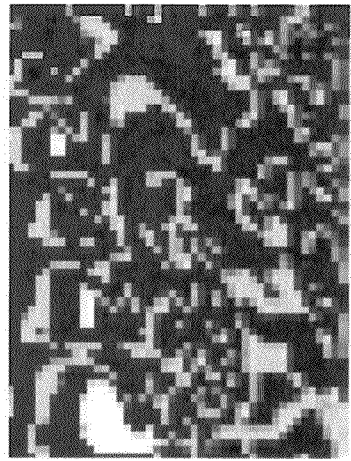

FIG. 38: RESULTS OF A IMPROVED LOG POSITIVE G$^{(2)}$ IMAGE GENERATED USING THE INVENTIVE PROCESSES EXHIBITING PHASE INFORMATION ABOUT THE TARGET REGION

FIG. 37: RESULTS OF A IMPROVED LOG NEGATIVE G$^{(2)}$ IMAGE GENERATED USING THE INVENTIVE PROCESSES EXHIBITING PHASE INFORMATION ABOUT THE TARGET REGION

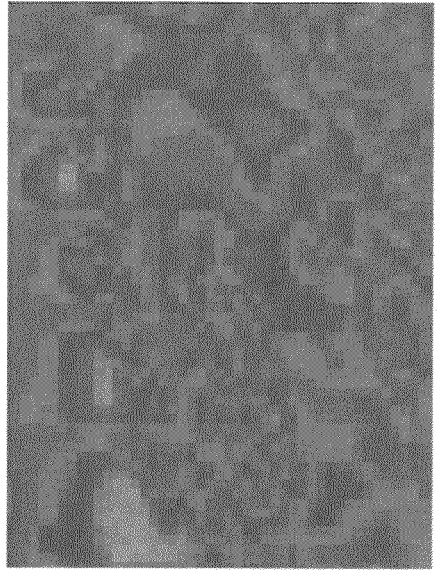

FIG. 39: RESULTS OF A G$^{(2)}$ IMAGE THAT PROVIDED THE INFORMATION USED IN FIGS. 37,38. VERY FAINT INDICATIONS OF PHASE INFORMATION ARE PRESENT IN THIS FIGURE.

SYSTEM AND METHOD FOR IMAGE ENHANCEMENT AND IMPROVEMENT

CROSS REFERENCE TO RELATED APPLICATION(S)

This application is a continuation-in-part (CIP) application of U.S. patent application Ser. No. 13/247,470 filed Sep. 28, 2011, herein incorporated by reference in its entirety.

GOVERNMENT INTEREST

The invention described herein may be manufactured, used, and/or licensed by or for the United States Government.

FIELD OF THE INVENTION

This invention relates in general to a method of image processing, and more specifically relates to image enhancement.

BACKGROUND OF THE INVENTION

Image processing is a form of signal processing for which the input is an image, such as a photograph or video frame, and the output is either image or a set of characteristics or parameters related to the image. Forms of image processing include face detection, feature detection, medical image processing, computer vision (extraction of information from an image by a computer), microscope image processing, etc.

Image resolution relates to the detail that an image possesses. For satellite images, the resolution generally correlates to the area represented by each pixel. Generally speaking, an image is considered to be more accurate and detailed as the area represented by each pixel is decreased. As used herein, the term images include digital images, electronic images, film images, and/or other types of images. Cameras taking pictures from great distances, such as aerial photos, may not obtain detailed information about the subject matter. Consequently, subtle or detail information are not present in the images.

When an image is captured by a monochrome camera, a single charge-coupled device (CCD) or complementary metal-oxide semiconductor (CMOS) sensor is used to form an image via the light intensity projected onto the sensor.

In U.S. Pat. No. 7,536,012, to Meyers et al., entitled "Entangled Quantum Communications and Quantum Imaging," there is disclosed, inter alia, a Quantum Imaging System (see Col. 8, line 50, et seq.) in which the sender sends an image of an image mask using entangled photons and coincidence measurements to a receiver. The system differs from the conventional quantum imaging set-up in that polarization beam splitters are placed in the path of the photons to provide two channels for each of the sender and the receiver, as shown in FIG. 4 of the '012 patent. On the sender's side, a photon beam is split by a beam splitter into first and second sub-beams. The first sub-beam is passed through a mask 164 which creates the image which is directed through a beam splitter 166 to bucket detectors 168, 170, which are operatively connected to a coincidence circuit. The second sub-beam is transmitted to the receiver without ever passing through the mask 164. In the embodiment of FIG. 4 of the '012 patent, the receiver receives the second sub-beam and an image of the mask is constructed based upon photon coincident measurements composited from two photon detectors 168 and 170, also referred to a bucket detectors. The image of a mask is transmitted via coincidences and the photons transmitting the image have never encountered the image mask. Because of the somewhat puzzling nature or circumstances of the transmission, the process has been dubbed by some as "Ghost Imaging," while others have explained the effects as resulting from the quantum properties of light.

SUMMARY OF THE INVENTION

The present invention provides a method and system for the enhancement of images using the quantum properties of light. An embodiment of the present invention increases the image quality of an object or scene as seen by a detector. When a low quality detector is aimed at an object, a high quality image is generated using the quantum properties of light. A low quality detector picks up quantum information on the object shape and its temporal relations to reference fields. The reference fields may be recorded by the same imager (CCD, camera, etc.) that acts as a bucket detector (that is, it does not necessarily contain spatial information).

Current imaging methods are limited to the quality of the detector looking at the object being imaged. A preferred embodiment generates an improved quality image of the object without the object being imaged in high resolution directly. The preferred method may be used in connection with photographs taken during turbulent conditions.

A preferred embodiment comprises at least one processor, at least one memory operatively associated with the at least one processor, the at least one processor operating to perform the following steps not necessarily in the order recited:

(a) providing a series of frames of a given region of interest;

(b) determining the value of each pixel at each location within each frame to form a first array of pixel values for each frame;

(c) determining the overall intensity of each frame;

(d) determining the product of the overall intensity and the array of pixel values for each frame;

(e) determining the sum of the products by adding together the products of the overall frame intensity and first array of pixel values for each frame;

(f) determining the average of the sum of products by dividing the sum of products by the number of frames in the series of frames;

(g) determining the average value of each pixel at each pixel location for the series of frames to form a second array of average pixel values;

(h) determining the average overall frame intensity for the series of frames;

(i) determining a second product of the second array of average pixel values and the average overall frame intensity;

(j) subtracting the second product from the first product to provide an improved image of the region of interest.

An alternate embodiment comprises computing the average overall intensity of a plurality of frames and arranging the frames into two sets. A first set contains the frames having frame intensities greater than the average overall intensity for all frames; the average overall intensity being the summation of the intensities for frames divided by the number of frames. The second set containing frames having an overall intensity less than the average overall intensity. Each of the first and second sets is processed by repeating steps (a) through (i). The result obtained using the second set of frames is then subtracted from the result obtained using the first set of frames to create the image.

Yet another embodiment includes a method for image improvement that comprises: providing a series of frames of a given region of interest; determining the value of each pixel within each frame to form a first array of pixel values; determining the integral of pixel values of each frame to form a second array of overall frame integrals; partitioning the first array into two sets based on a predetermined criteria; partitioning the second array into two sets based on a predetermined criteria; using the first and second sets of the first and second arrays to compute a conditional product term for each of the four combinations of the first and second sets of the first and second arrays; and combining the conditional product terms to provide an improved image of the region of interest.

And yet a further embodiment includes a method for image improvement comprising: providing a series of frames of a given region of interest; determining the value of each pixel at each location within each frame to form a first array of pixel values for each frame; determining the overall intensity of each frame; determining the product of the overall intensity and the array of pixel values for each frame; determining the sum of the products by adding together the products of the overall frame intensity and first array of pixel values for each frame; determining the average of the sum of products by dividing the sum of products by the number of frames in the series of frames; determining the average value of each pixel at each pixel location for the series of frames to form a second array of average pixel values; determining the average overall frame intensity for the series of frames; determining a second product of the second array of average pixel values and the average overall frame intensity; subtracting the second product from the first product to provide an improved image of the region of interest; partitioning the improved image into at least two partitions based on a predetermined criteria; mathematically operating upon the partitioned improved image to increase image contrast or image clarity.

BRIEF DESCRIPTION OF THE DRAWINGS

The present invention can best be understood when reading the following specification with reference to the accompanying drawings, which are incorporated in and form a part of the specification, illustrate alternate embodiments of the present invention, and together with the description, serve to explain the principles of the invention. In the drawings:

FIG. 4 is a partial schematic block diagram illustration of the steps for performing an alternate preferred method of the present invention in which steps performed on the first set of frames are illustrated.

FIG. 5 is a partial schematic block diagram illustration of the steps for performing an alternate preferred method of the present invention in which steps performed on the second set of frames are illustrated.

FIG. 6 is a partial schematic block diagram illustration of the steps for performing an alternate preferred method of the present invention in which the refined image data for the second set is subtracted from the refined image data for the first set.

FIG. 7 is an illustration a $G^{(2)}$ Virtual Ghost Image with turbulence using 10 k frames.

FIG. 8 is an illustration of a $G^{(2)}$ Ghost image computed using the 2 path configuration.

FIG. 9 is an illustration of the "Mean Bucket/Target Image" using 10 k frames.

FIG. 10 is an illustration of a "Self Bucket G(2) GPSR with turbulence" using 10 k Frames; data normalized globally 0-1; $\tau=1\times10^8$; Tol=$1\times10^{-6}$; Non Zero=67 (number of pixels not zero).

FIG. 11 is an illustration of a "Self Bucket G(2) GPSR" with turbulence 10 k Frames; Data normalized globally 0-1; $\tau=5\times10^7$; Tol=$1\times10^{-6}$; Non Zero=131.

FIG. 12 is an illustration of a "Self Bucket G(2) GPSR" with turbulence 10 k Frames; Data normalized globally 0-1; $\tau=2.5\times10^7$; Tol=$1\times10^{-6}$; Non Zero=183.

FIG. 13 is an illustration of a "Self Bucket G(2) GPSR" with turbulence 10 k Frames; Data normalized globally 0-1; $\tau=1\times10^7$; Tol=$1\times10^{-6}$; Non Zero=304.

FIG. 14 is an illustration of a "Self Bucket $G^{(2)}$ GPSR" with turbulence 10 k Frames; Data normalized globally 0-1; $\tau=1\times10^6$; Tol=$1\times10^{-6}$; Non Zero=1310.

FIG. 15 is an illustration of a sample instantaneous data image.

FIG. 16 is an illustration of an average of 335 frames.

FIG. 17 is an illustration of an image formed utilizing the Ghost imaging concept using 2 frames taken at a distance of 100 m through turbulence.

FIG. 18 is an illustration of an image formed using 335 frames; "Self Bucket G(2), 100 m distance through turbulence.

FIGS. 21-31 is schematic block diagram illustration of the steps to compute the fluctuation, or deviation from the mean value of the series of "bucket" measurements according to embodiments.

FIG. 21 is schematic block diagram illustration of the steps to compute the fluctuation, or deviation from the mean value of the series of the per frame pixel measurements.

FIG. 22-23 are a partial schematic block diagram illustration of the steps for performing an alternate preferred method of the present invention in which steps performed on the above mean, above mean sets of frames are illustrated.

FIGS. 24-25 are a partial schematic block diagram illustration of the steps for performing an alternate preferred method of the present invention in which steps performed on the below mean, below mean sets of frames are illustrated.

FIGS. 26-27 are a partial schematic block diagram illustration of the steps for performing an alternate preferred method of the present invention in which steps performed on the above mean, below mean sets of frames are illustrated.

FIGS. 28-29 are a partial schematic block diagram illustration of the steps for performing an alternate preferred method of the present invention in which steps performed on the below mean, above mean sets of frames are illustrated.

FIG. 30 is a partial schematic block diagram illustration of the steps for performing an alternate preferred method of the present invention in which the improved final image is determined by adding the above-mean, above mean image to the below-mean, below-mean images, subtracting the above-mean, below-mean image, and subtracting the below-mean, above mean image.

FIG. 31 is a partial schematic block diagram illustration of the steps for performing an alternate preferred method of the present invention in which the improved final image is determined by adding the above-mean, above mean image, the below-mean, below-mean image, the above-mean, below-mean image, and the below-mean, above mean image.

FIG. 32 shows results using a standard $G^{(2)}$ calculation to provide a baseline to demonstrate the advantages of the methods presented in this disclosure.

FIG. 33 is an illustration of the improved imaging results when applying the methods and processes outlined in FIG. 30. The trees in the distance and clouds are much more distinguishable in this figure when compared to the results shown in FIG. 32.

FIG. 34 is an illustration of the improved imaging results using the methods and processes outlined in FIG. 31. As in FIG. 33, the trees and clouds are much more distinguishable than what is seen in FIG. 32.

FIG. 35 is an illustration of the image contract improvement. Both the Log positive and negative components of the base $G^{(2)}$ image show increased contrast and sharpening of edges especially when compared to the average image in the lower left.

FIG. 36 is an illustration of improved image results generated. Features such as the lamp post show much more contrast and edge clarity.

FIG. 37 is an illustration of a log—negative values of $G^{(2)}$ improved image result generated. This image exhibits phase information about the target region. Images with phase information often provide very high contrast. The dark and light parts of FIG. 37 are nearly opposite to the same areas in FIG. 38.

FIG. 38 Is an illustration of a log positive values of $G^{(2)}$ improved image result generated. This image exhibits phase information about the target region. Images with phase information often provide very high contrast. The dark and light parts of FIG. 37 are nearly opposite to the same areas in FIG. 38.

FIG. 39 is an illustration of results using a standard $G^{(2)}$ calculation to provide a baseline to compare with the improved imaging results presented in FIGS. 37 and 38. Very faint indications of phase information are present in this figure are greatly enhanced in FIG. 37 and FIG. 38.

DETAILED DESCRIPTION OF THE PREFERRED EMBODIMENTS

Figure 1:
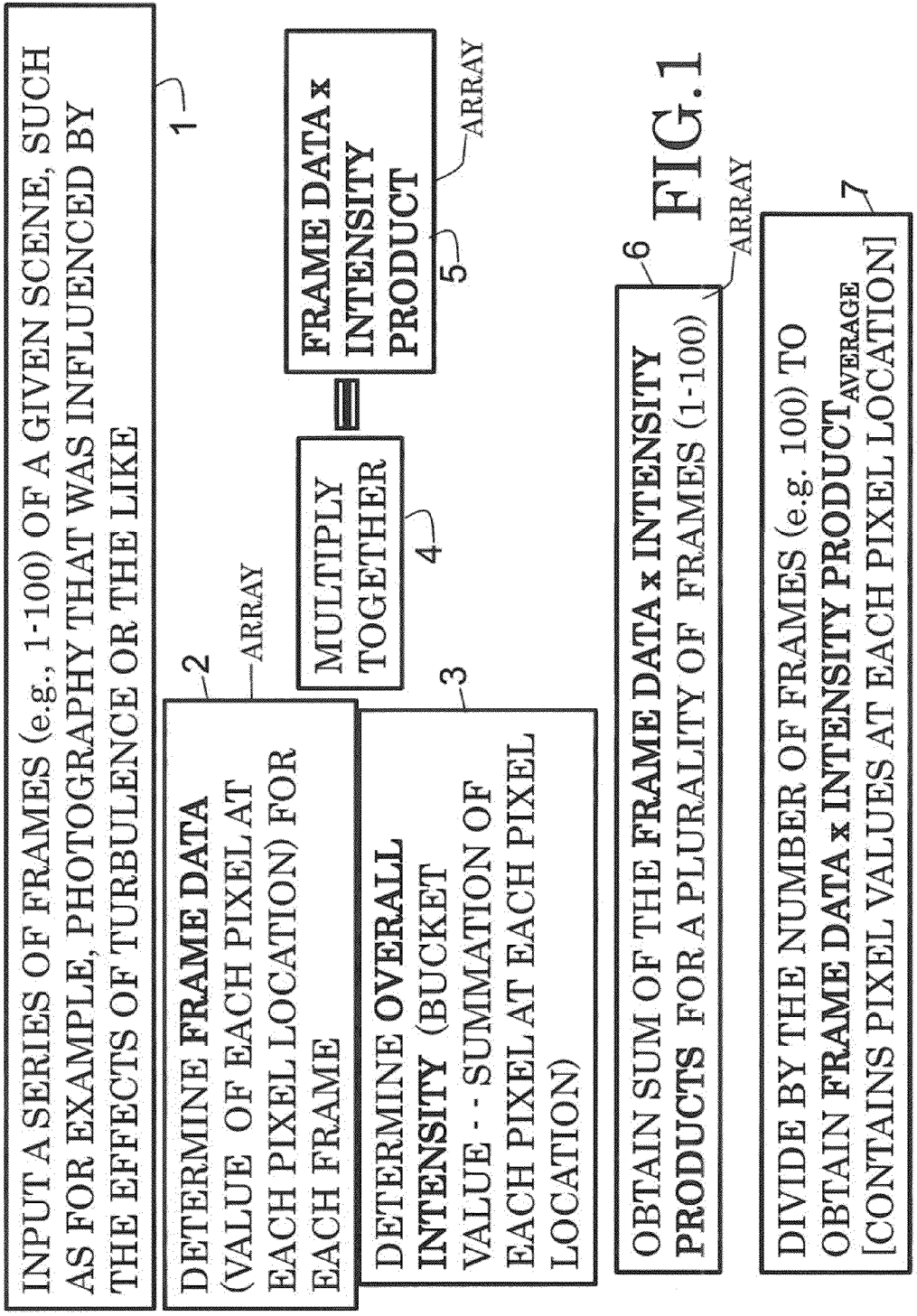
FIG. 1 is a partial schematic block diagram illustration of the steps for performing a preferred method of the present invention.

The embodiments herein and the various features and advantageous details thereof are explained more fully with reference to the non-limiting embodiments that are illustrated in the accompanying drawings and detailed in the following description. Descriptions of well-known components and processing techniques are omitted so as to not unnecessarily obscure the embodiments herein. The examples used herein are intended merely to facilitate an understanding of ways in which the embodiments herein may be practiced and to further enable those of skill in the art to practice the embodiments herein. Accordingly, the examples should not be construed as limiting the scope of the embodiments herein.

Rather, these embodiments are provided so that this disclosure will be thorough and complete, and will fully convey the scope of the invention to those skilled in the art. Like numbers refer to like elements throughout. As used herein the term "and/or" includes any and all combinations of one or more of the associated listed items.

The terminology used herein is for the purpose of describing particular embodiments only and is not intended to limit the full scope of the invention. As used herein, the singular forms "a", "an" and "the" are intended to include the plural forms as well, unless the context clearly indicates otherwise. It will be further understood that the terms "comprises" and/ or "comprising," when used in this specification, specify the presence of stated features, integers, steps, operations, elements, and/or components, but do not preclude the presence or addition of one or more other features, integers, steps, operations, elements, components, and/or groups thereof.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

The current invention utilizes the ability to increase the image quality of an object as seen by a detector using methods relating to the Quantum nature of light. When a low quality detector is aimed at an object, then a high quality image may be generated based on the quantum properties of light. The high quality image is generated even in the presence of turbulence which might otherwise be disruptive to image clarity. Scattering of quantum particles such as photons off the object carries information of the object shape even when the quantum particles such as photons do not go directly into the camera or detector. An additional low quality bucket detector (i.e. detector lacking spatial information) records quantum information on the object shape and its temporal relations to collocated reference fields. The reference fields are recorded by the same type of imager (CCD, Camera, etc.) that looks at the object and which act like bucket detectors in U.S. Pat. No. 7,536,012, hereby incorporated by reference.

Current Imaging methods are limited to the quality of the detector looking at the object being imaged. This invention enables an image quality improvement by using Ghost Imaging Inspired methods to generate a high quality image of the object without the object being imaged in high resolution directly. One embodiment enables high quality imaging when only low quality images of the object are imaged directly.

Referring now to FIG. 1, in accordance with one embodiment, in Box 1 a series of frames are inputted into the memory or input of a processor or image processor. The frame may be composed on a plurality of pixels, typically in a two-dimensional (2D) array, that together form an image. Exemplary frames may be electronic image data such a TIFF or JPEG file. As used herein the terminology "processor" or "image processor" as used in the following claims includes a computer, multiprocessor, CPU, minicomputer, microprocessor or any machine similar to a computer or processor which is capable of processing algorithms. The frames may comprise photographs of the same region of interest. The region of interest may be a scene, landscape, an object, a subject, person, or thing. In Box 2, the frame data or value of each pixel at each pixel location is determined for a frame. In Box 3, the overall intensity of the frame is determined. The overall intensity correlates to a "bucket value" determination in that overall intensity value does not comprise spatial information. Instead, it correlates to the summation of the light intensity of a frame. In the case of a picture, the overall intensity correlates to the sum of the reflected illumination. In the case of an electronic display formed by pixels, the overall intensity is the summation each pixel value at each pixel location within a given frame. At Box 4, the values in Box 2 are multiplied by the value determined in Box 3. Box 5 represents the Frame Data×Intensity Product for the frame. Inasmuch as the Frame Data is an array of pixel values, the Frame Data×Intensity Product is also an array of values. At Box 6, the products of Box 5 (Frame Data×Intensity Product) are repeated for each frame in a selected plurality of frames. As an example, one hundred frames may be selected. At Box 7, the summation of the Frame Data×Intensity Products for the plurality of frames determined in Box 6 is divided by the number of frames (such as for example one hundred) to determine the Frame Data× Intensity Product Average for the plurality of frames. As noted in Box 7, this Product Average is an array containing pixel values at each pixel location within the frame.

Figure 2:
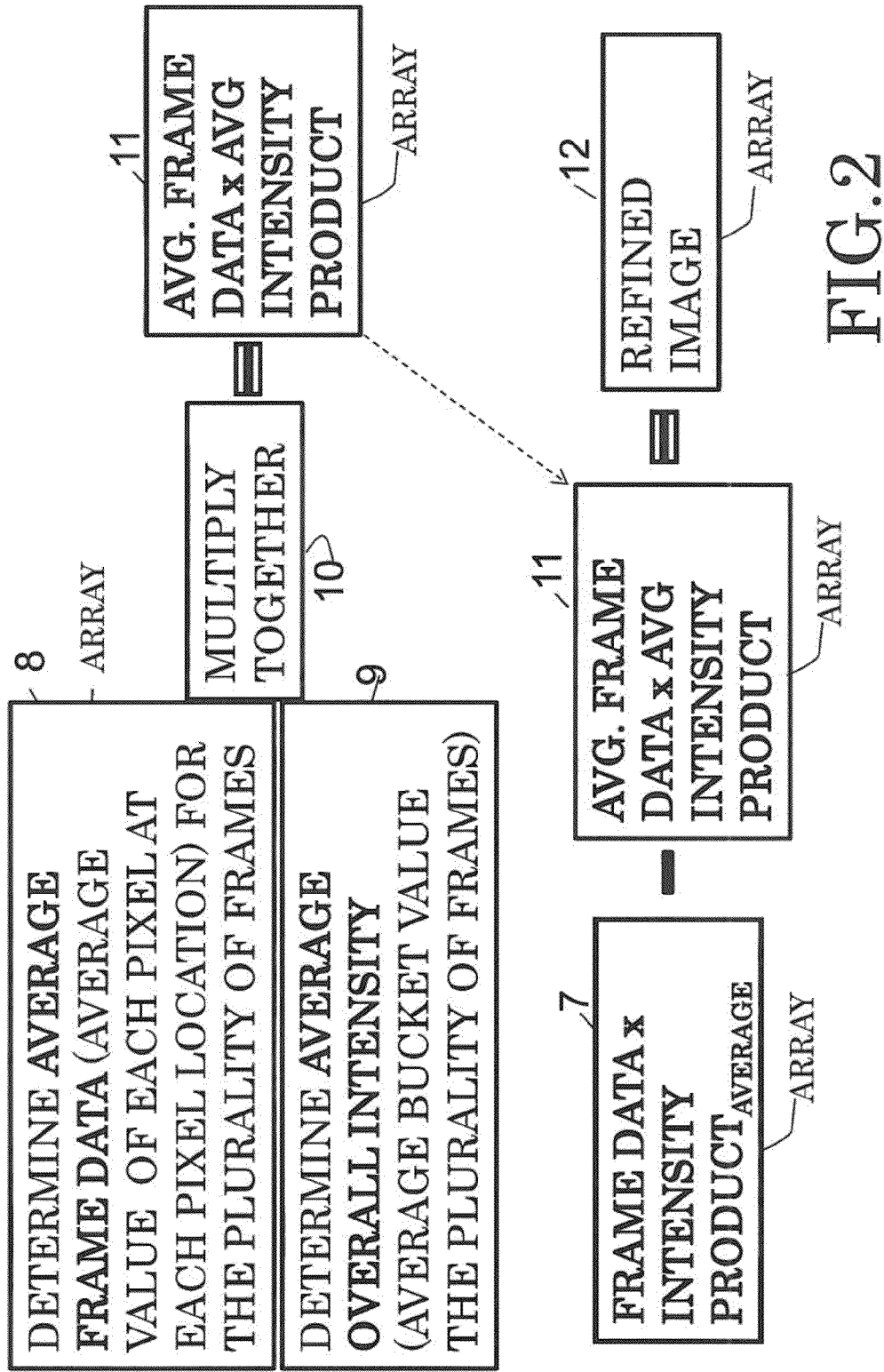
FIG. 2 is a schematic block diagram illustration of the steps for performing a preferred method of the present invention. Taken together, FIGS. 1 and 2 outline the steps of a preferred methodology for the present invention.

FIG. 2 is a further description of a methodology of the present invention. Note that Box 7 is carried over from FIG. 1 into FIG. 2. In Box 8, the average frame data (or average value of each pixel at each pixel location) is determined for the plurality of frames (e.g. 100) by averaging the pixel values at each pixel location for the plurality of frames to determine an array of average pixel values. In Box 9, the average overall intensity for the plurality of frames is determined. The is similar to the determination of Box 3 except that Box 3 is a determination for a frame and Box 9 is an average for a plurality of frames. As stated with respect to Box 3, the overall frame intensity correlates to a "bucket value" determination in that overall intensity value does not comprise spatial information. Instead, it correlates to the summation of the light intensity of a frame. In the case of a picture, the overall frame intensity correlates to the sum of the reflected illumination. In the case of an electronic display formed by pixels, the overall intensity is the summation each pixel value at each pixel location within a given frame. The average overall intensity is the summation of the values for a plurality of frames divided by the number of frames.

Box 10 represents the multiplication of Boxes 8 and 9 to form the Average Frame Data×Average Intensity Product, which is an array. As shown in the bottom portion of FIG. 2, the Average Frame Data×Average Intensity Product is subtracted from the Frame Data×Intensity Product Average to form the refined image of Box 12.

It is postulated that the preferred methodology in effect subtracts out or negates the effects or errors due to the effects of turbulence or the like. Most fluctuations caused by turbulence occur at the "edges" of objects. The algorithm focuses on the edges of letters, objects, etc. to refine the image edges.

Figure 3:
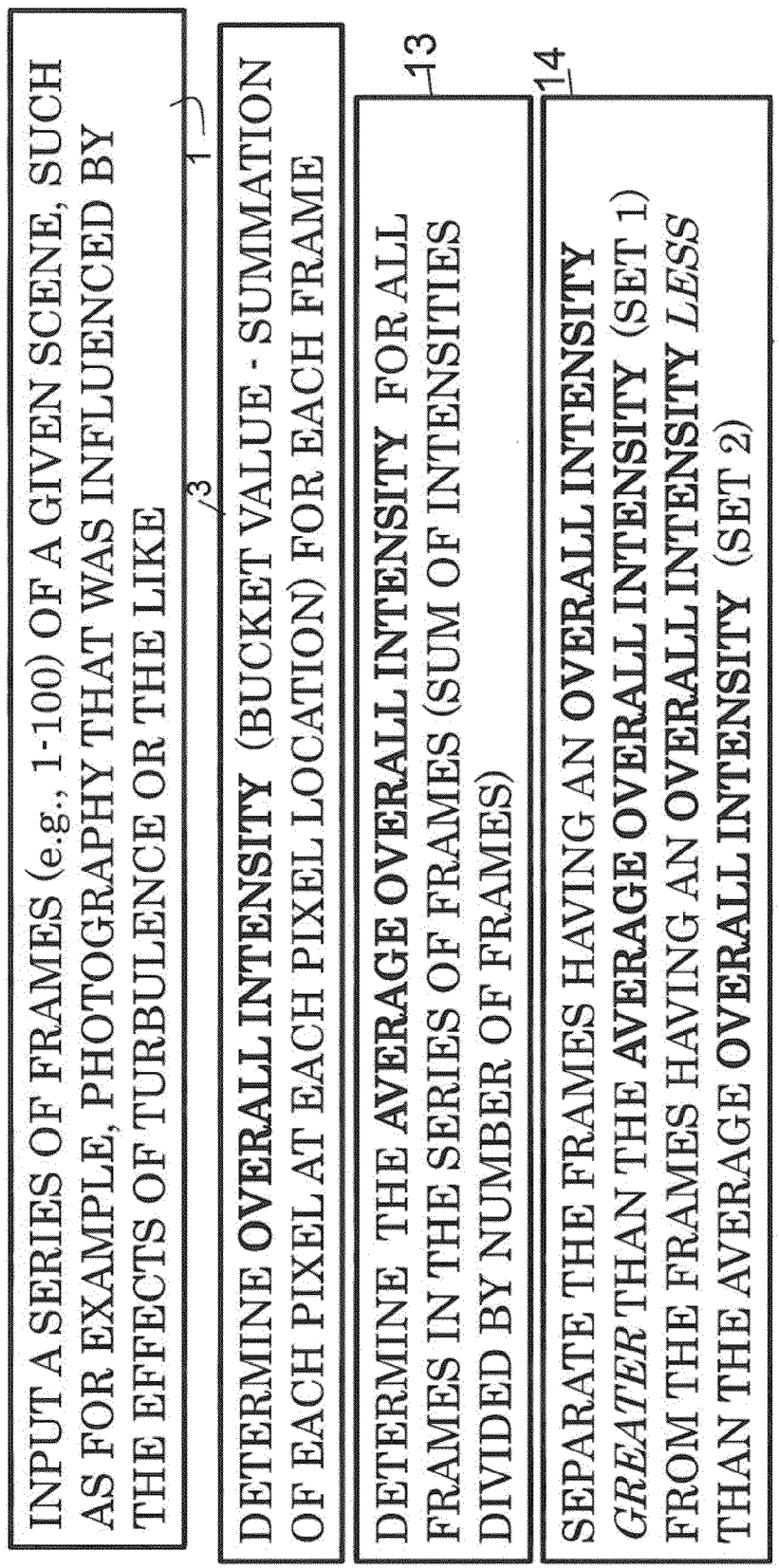
FIG. 3 is a partial schematic block diagram illustration of the steps for performing an alternate preferred method of the present invention in which steps for dividing the frames into two sets are illustrated.

FIG. 3 is a partial schematic block diagram illustration of the steps for performing an alternate preferred method of the present invention in which steps for dividing the frames into two sets are illustrated. In Box 1 a series of frames are inputted into the memory or input of a processor or image processor. The frames may comprise photographs of the same region of interest. The region of interest may be a scene, landscape, an object, a subject, person, or thing. In Box 3, the overall intensity of the frame is determined. The overall intensity correlates to a "bucket value" determination in that overall intensity value does not comprise spatial information. Instead, it correlates to the summation of the light intensity of a frame. In the case of a picture, the overall intensity correlates to the sum of the reflected illumination. In the case of an electronic display formed by pixels, the overall intensity is the summation each pixel value at each pixel location within a given frame. In Box 13, the average overall intensity for all frames in the inputted (see Box 1) is computed. To determine the average overall intensity, the summation of the intensities for frames is divided by the number of frames. In Box 14, the frames are separated into two sets; set one contains frames having an overall intensity greater than the average overall intensity (derived in Box 13) and set two contains frames having an overall intensity less than the average overall intensity (derived in Box 13)

FIG. 4 is a partial schematic block diagram illustration in which steps performed on the first set of frames are illustrated. The figure shows how to generate a first set of data which is referred to here at SET 1. SET 1 frame set includes frames having an overall intensity greater than the average overall intensity. The steps are comparable in effect to the similarly numbered frames in FIGS. 1 and 2, as denoted by the addition of a letter "A" suffix to the correlating element number. In Box 2A, the frame data or value of each pixel at each pixel location is determined for a frame. In Box 3A, the overall intensity ("bucket value") of the frame is determined. In the case of a picture, the overall intensity correlates to the sum of the reflected illumination. In the case of an electronic display formed by pixels, the overall intensity is the summation each pixel value at each pixel location within a given frame. At Box 4, the values in Box 2A are multiplied by the value determined in Box 3A. Box 5A represents the Frame Data×Intensity Product for the frame. Inasmuch as the Frame Data is an array of pixel values, the Frame Data×Intensity Product is also an array of values. At Box 6A, the products of Box 5A (Frame Data×Intensity Product) are repeated for each frame in the first set of frames. At Box 7A, the summation of the Frame Data×Intensity Products for the plurality of frames determined in Box 6A is divided by the number of frames (such as for example one hundred) to determine the Frame Data×Intensity Product Average for the first set of frames. As noted in Box 7A, this Product Average is an array containing pixel values at each pixel location within the frame.

In the lower portion of FIG. 4, note that Box 7A is repeated as shown by the arrow. In Box 8A, the average frame data (or average value of each pixel at each pixel location) is determined for the first set of frames by averaging the pixel values at each pixel location for the first set of frames to determine an array of average pixel values for the first set. In Box 9A, the average overall intensity for the first set of frames is determined. This is similar to the determination of Box 3A except that Box 3A is a determination for a frame and Box 9A is an average for a plurality of frames. As stated with respect to Box 3A, the overall frame intensity correlates to a "bucket value" determination in that overall intensity value does not comprise spatial information. Instead, it correlates to the summation of the light intensity of a frame. In the case of a picture, the overall frame intensity correlates to the sum of the reflected illumination. In the case of an electronic display formed by pixels, the overall intensity is the summation each pixel value at each pixel location within a given frame. The average overall intensity is the summation of the values for a plurality of frames divided by the number of frames.

Box 10 represents the multiplication of Boxes 8A and 9A to form the Average Frame Data×Average Intensity Product, which is an array. As shown in the bottom portion of FIG. 4, the Average Frame Data×Average Intensity Product is subtracted from the Frame Data×Intensity Product Average to form the refined image of Box 12A.

FIG. 5 is a partial schematic block diagram illustration of the steps for performing an alternate preferred method of the present invention in which steps performed on the second set of frames are illustrated. The figure shows how to generate a second set of data which is referred to here at SET 2. The SET 2 frame set includes frames having an overall intensity less than the average overall intensity.

The steps are comparable in effect to the similarly numbered frames in FIGS. 1, 2, and 4 as denoted by the addition of a letter "B" suffix to the correlating element number. In Box 2B, the frame data or value of each pixel at each pixel location is determined for a frame. In Box 3B, the overall intensity ("bucket value") of the frame is determined. In the case of a picture, the overall intensity correlates to the sum of the reflected illumination. In the case of an electronic display formed by pixels, the overall intensity is the summation each pixel value at each pixel location within a given frame. At Box 4, the values in Box 2B are multiplied by the value determined in Box 3B. Box 5B represents the Frame Data×Intensity Product for the frame. Inasmuch as the Frame Data is an array of pixel values, the Frame Data×Intensity Product is also an array of values. At Box 6B, the products of Box 5B (Frame Data×Intensity Product) are repeated for each frame in a second set of frames. At Box 7B, the summation of the Frame Data×Intensity Products for the plurality of frames determined in Box 6B is divided by the number of frames (such as for example one hundred) to determine the Frame Data× Intensity Product Average for the second set of frames. As noted in Box 7B, this Product Average is an array containing pixel values at each pixel location within the frame.

In the lower portion of FIG. 5, note that Box 7B is repeated as shown by the arrow. In Box 8B, the average frame data (or average value of each pixel at each pixel location) is determined for the first set of frames by averaging the pixel values at each pixel location for the first set of frames to determine an array of average pixel values for the first set. In Box 9B, the average overall intensity for the second set of frames is determined. This is similar to the determination of Box 3B except that Box 3B is a determination for a frame and Box 9B is an average for a plurality of frames. As stated with respect to Box 3B, the overall frame intensity correlates to a "bucket value" determination in that overall intensity value does not comprise spatial information. Instead, it correlates to the summation of the light intensity of a frame. In the case of a picture, the overall frame intensity correlates to the sum of the reflected illumination. In the case of an electronic display formed by pixels, the overall intensity is the summation each pixel value at each pixel location within a given frame. The average overall intensity is the summation of the values for a plurality of frames divided by the number of frames.

Box 10 represents the multiplication of Boxes 8B and 9B to form the Average Frame Data×Average Intensity Product, which is an array. As shown in the bottom portion of FIG. 5, the Average Frame Data×Average Intensity Product is subtracted from the Frame Data×Intensity Product Average to form the refined image of Box 12B.

FIG. 6 is a partial schematic block diagram illustration of the steps for performing an alternate preferred method of the present invention in which the refined image data for the second set is subtracted from the refined image data for the first set to form enhanced image data (Box 12C).

Another alternate preferred method of the present invention applies the use of techniques from the field of Compressive Imaging or Compressive Sensing. In this embodiment the "bucket" values for each frame of the series is computed by integrating the values of the pixels within each frame. This bucket data is stored for use per Eq. 5 below. The pixel values for each frame of the series are stored as a row in a matrix J. The improved image is computed by application of a Compressive Imaging inversion algorithm such as GPSR to solve Eq. 6. The improved image is returned in the matrix R.

Virtual Ghost Imaging

Virtual Ghost Imaging refers to an imaging process which creates an enhanced image from a series of frames of an imaging subject based on a process related to Ghost Imaging.

Virtual Ghost Imaging in the current instance applies the following process to a series of frames of an imaging subject. Inasmuch as the overall frame intensity value determined in Box 3 correlates to the "bucket" value, a brief discussion of ghost imaging and reflective ghost imaging follows. Typically ghost imaging uses two detectors, one to observe the light source and the other, single pixel or bucket detector, to observe the light scattering and reflecting from the target object.

$$G^{(2)} = \langle I(x,y,t)_{source} I(t)_{bucket} \rangle - \langle I(x,y,t)_{source} \rangle \langle I(t)_{bucket} \rangle \quad (1)$$

where $\langle \rangle$ denotes an ensemble average. If $I_{source}$ and $I_{bucket}$ are recorded from the same target object, $I_{bucket}$ may be computed as $$I(t) = \int dx\, dy\, I(x,y,t) \text{source} \quad (2)$$

Basic Virtual Ghost Imaging

Results of an experiment conducted through turbulence using chaotic laser or pseudo-thermal light are presented in FIG. 7. FIG. 8 shows the same target computed with data taken using a typical two path configuration.

FIG. 8 shows the average of the target images that were captured through turbulence. Note the blurriness and lack of definition of the letters. As one can see the "ARL" in FIG. 7 is a visually better image than that displayed FIG. 9. However, the "true" ghost image displayed in FIG. 8 has better contrast and definition of the letters than FIG. 7 or FIG. 9. This is likely due to the use of a reference field that has not been altered by interaction with a target object.

Accelerated (Compressive Imaging) $G^{(2)}$ Virtual Ghost Imaging

A relatively new mathematical field named Compressive Sensing (CS) or Compressive Imaging (CI) can be used to good effect within the context of ghost imaging. The first use of compressive techniques in the context of Ghost Imaging was performed by the Katz group (see O. Katz, et al., "Compressive Ghost Imaging," Appl Phys. Lett., 95, 131110 (2009)) (hereby incorporated by reference) who demonstrated a ghost like imaging proposal of Shapiro (see J. Shapiro, "Computational Ghost Imaging," Phys. Rev. A 78 061802(R) (2008)). Their demonstration was limited to a transmission object.

More recently the present inventors have performed experiments of this nature using reflection objects.

The inventors' use of CS and CI is based on finding approximate solutions to the integral equations using the GPSR mathematical methodology where $$JR = B \quad (3)$$

and $$R = R(x, y) \quad (4)$$

is the object reflectance. The term J is a matrix, where the rows are the illumination patterns at time k and the B vector:

$$B = [B_k] \quad (5)$$

represents the bucket values. In cases where the system is underdetermined (too few $[B_k]$), then $L_1$ constraints are applied to complete the system and sparseness is used:

$$\underset{R}{\arg\min} = \frac{1}{2}\|B - JR\|_2^2 + \tau\|R\|_1 \quad (6)$$

The CS computational strategy takes advantage of the fact that it is normally true in images that not all pixels in an image contain new information and the system is said to be sparse on some basis since fewer degrees of freedom are needed to describe the system than the total number of pixels in the image. Data used to reconstruct an image can be referred to as sparse image data or sparse data. The parameter τ is often a constant.

CI results for the ARL target are presented using Eq. 2 and varying the τ parameter. FIG. 10 is an example of a result where τ is too large and most of the pixel values are driven to 0. One can sense that the letters "ARL" are in the figure. Decreasing τ to a value of 5e7, shown in FIG. 11 more portions of the "ARL" letters appear. When τ is set to 2.5e7 the R is quite clear in FIG. 12 but the appearance of the A and the L are still degraded. Continuing with the examination of the effect of the parameter τ, the value of τ is set to 1e7. These results are shown in FIG. 13.

Finally, as a lower image quality bound, τ is set to equal 1e6. The "ARL" presented in FIG. 14 is quite degraded. These GPSR calculated Virtual Ghost imaging results highlight the sensitivity of the calculations to an external parameter (τ) which has no connection to the underlying physics.

Air Force Resolution Target

Results were computed using Eq. 1 subject to the self-bucketing concept of Eq. 2. These results are generated from a few hundred shots of the Air Force resolution target imaged at a 100 m distance through turbulence.

A single image from this data set is presented in FIG. 15. This image illustrates the distorting effect of turbulence on imaging. A simple averaging of 335 frames of the dataset that was performed is shown in FIG. 16. This average image has some better qualities that the single frame image of FIG. 15 but one can still only resolve the coarser scale features of the Air Force target.

Using the self-bucket ghost imaging concept on this dataset, an initial result using only 2 frames of the dataset is displayed in FIG. 17. Some of the edges in this image are very distinct and superior to areas in either the instantaneous or the average images. When the entire dataset is used, as presented in FIG. 18, the results are striking. In particular the 4 and 5 on the right side of the target are legible and the small horizontal and vertical bars to the left of the numbers are distinct; whereas those regions in the instantaneous and average images are simply blurs.

Figure 19:
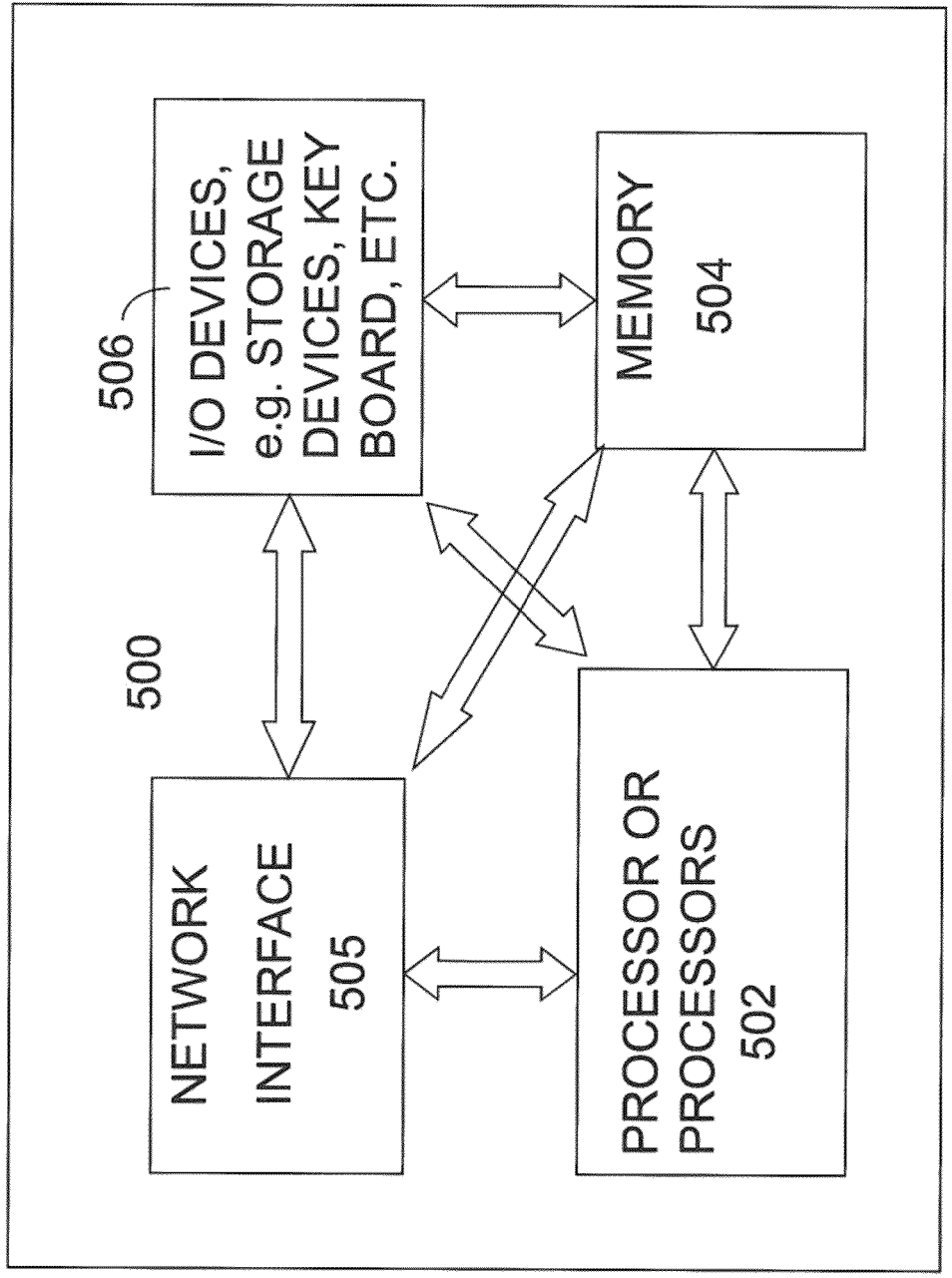
FIG. 19 depicts a high level block diagram of a general purpose computer configured to implement embodiments of the present invention.

FIG. 19 depicts a high level block diagram of a general purpose computer suitable for use in performing the functions described herein, including the steps shown in the block diagrams, schematic representations, and/or flowcharts in the various embodiments disclosed throughout this application. As depicted in FIG. 19, the system 500 includes a processor element 502 (e.g., a CPU) for controlling the overall function of the system 500. Processor 502 operates in accordance with stored computer program code, which is stored in memory 504. Memory 504 represents any type of computer readable medium and may include, for example, RAM, ROM, optical disk, magnetic disk, or a combination of these media. The processor 502 executes the computer program code in memory 504 in order to control the functioning of the system 500. Processor 502 is also connected to network interface 505, which transmits and receives network data packets. Also included are various input/output devices 506 (e.g., storage devices, including but not limited to, a tape drive, a floppy drive, a hard disk drive or compact disk drive, a receiver, a transmitter, a speaker, a display, a speech synthesizer, an output port, and a user input device (such as a keyboard, a keypad, a mouse and the like).

Further Improvement Embodiments

This application provides further improvements over the embodiments discussed in the parent application. One key difference is that the improvement embodiments provide a method to partition the values in the measured data sets, i.e. frames, into two or more groups for the frame data (reference fields) and overall frame intensities (bucket values). These groups are then used to compute products, or cross-correlations, between the different groupings. These individual product terms can be mathematically combined, via addition and/or subtraction processes, to generate improve images of the target or scene. This method further adapts the techniques presented in the parent application. One key advantage to this method is that it is possible with the following embodiments to generate all positive valued images and largely eliminate background and noise effects. Other advantages include the ability to operate on a computed partitioned image using functions such as logarithms and exponentials to further increase contrast or better identify objects and information on their properties.

The following embodiments are predicated on the appreciation that other operations involving the partitioned sets of above average and below average measurements are beneficial to improve image quality in adverse conditions such as turbulence. These operations would include but are not limited to cross-correlations between above average bucket (overall frame intensities) and below average reference fields. Typically four correlation types are available when data is partitioned into two distinct sets such as above the average and below the average values. In a non-normalized form this can be written as $$R_m = \frac{1}{N_M} \sum_1^{N_M} I_a I_b \qquad (7)$$

where $R_m$ is proportional to the correlation between the two data sets $I_a$ and $I_b$. NM is the number of elements in the data sets being considered. Normalization is usually accomplished by dividing the $R_m$ by the standard deviations of $I_a$ and $I_b$.

$$RN_m = \frac{R_m}{\sigma_{I_a} \sigma_{I_a}} \qquad (8)$$

The data sets $I_a$ and $I_b$ are used in the current invention as the deviations from the average or mean.

$$I_a = (M_a - \langle M \rangle) \qquad (9)$$

where the M's indicate the measurement, either an individual pixel value or the bucket value and the < > indicates and average over the ensemble of the measurements.

The product terms that comprise a particular $R_m$ are computed conditionally. The $R_m$ can be called conditional product terms. For instance, $R_m$ may be computed for the set of pixel values $I_a$ that are above the mean for those frames of data with bucket values $I_b$ that are above the mean. For example:

$$R_m^{++} = \frac{1}{N_m^+} \Sigma_1^{N_m^+} I_a^+ I_b^+ \qquad (10)$$

The other combinations of above/below mean pixel values and above/below mean bucket values are computed similarly. These conditional $R_m$ may then be added or subtracted from each other to yield improved images of a scene or target. Furthermore, it should be noted that the particular combination of the $R_m$ below $$R_m^{++} + R_m^{--} - R_m^{+-} - R_m^{-+} \quad (11)$$

is always positive.

A second alternative embodiment may include computing a $G^{(2)}$ improved image. This improved image is then partitioned into pixels that are, for example, above the spatial mean $G^{(2)}$ and pixels that are below the spatial mean $G^{(2)}$. These alternative positive/negative $G^{(2)}$ partitioned improved images can display higher contrast and can be further operated upon by using mathematical operations such as logarithms to increase the dynamic range. It is to be recognized that other partitions are possible to tailor results needed for specific applications.

A third embodiment may include computing a $R_m$ correlation image by calculating the correlation coefficient between the $I_a$ and $I_b$ partitions where the $I_a$ and $I_b$ are not aligned in time or frame. For instance, at a particular pixel i,j there may be 10 frames in which that pixel is above the mean value of that pixel for all frames, and there may only be say 5 frames for which the $I_b$ values is above the mean of $I_b$. A correlation coefficient may be computed between these two sets of data using:

$$R(i, j) = \frac{c(i, j)}{\sqrt{c(i, i) c(j, j)}} \quad (12)$$

where R(i,j) is the correlation coefficient between variables i and j. C indicates a covariance calculation between the variables i and j. The data sets are forced to be the same length, as required by the above R(i,j) process, by simply setting N to be the length of the data set with fewer elements and then taking the first N values of the data set that has a greater number of elements. This can lead to cross-time correlations that may prove useful for certain applications. The method of calculating the values of R(i,j) may also use the processes outlined above.

Figure 20:
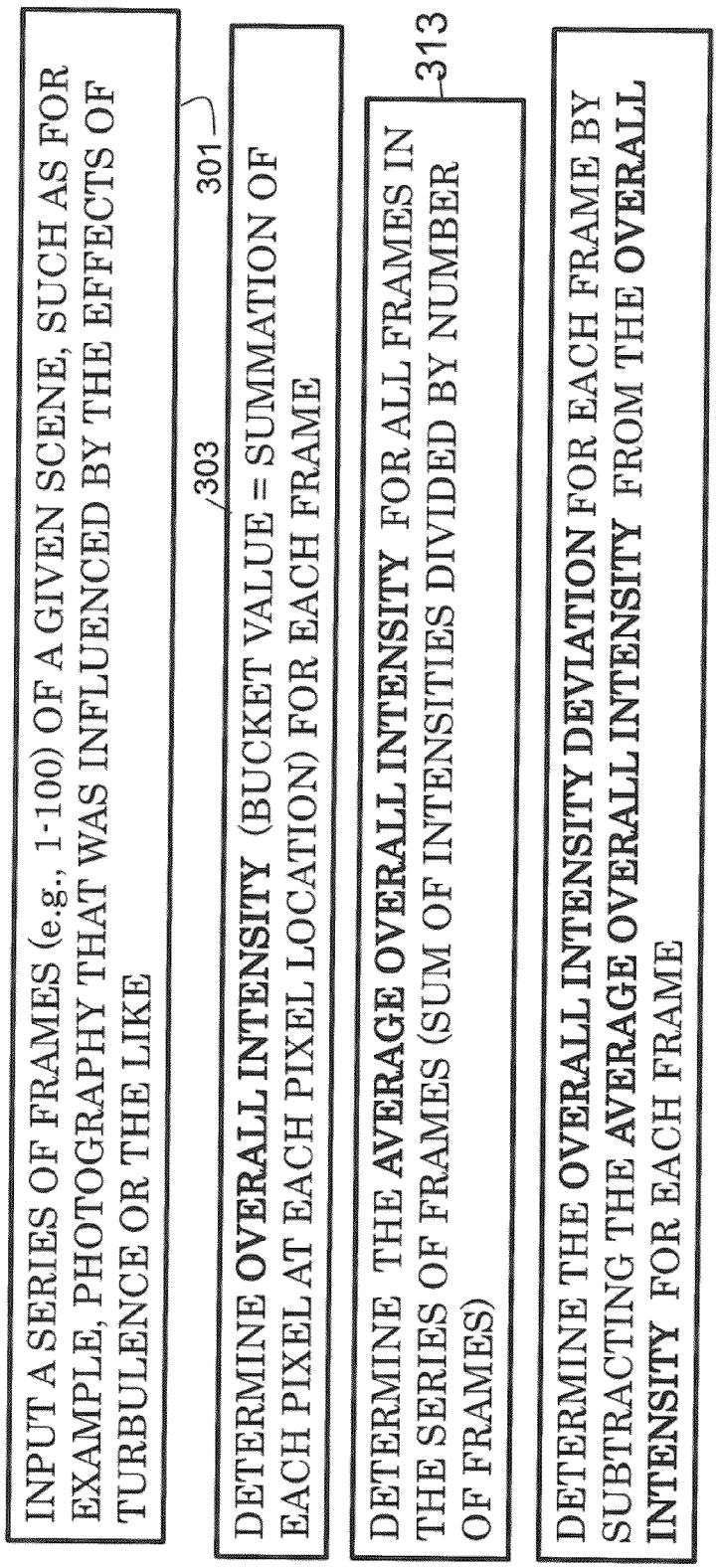

FIGS. 20-31 represent a partial schematic block diagram illustration of the steps for performing one embodiment of the present invention. In FIG. 20: Box 301, a series of frames are entered into the memory or input of a processor or image processor. The frames may comprise photographs of the same region of interest. The region of interest may be a scene, landscape, an object, a subject, person, or thing. In Box 303, the overall intensity of the frame is determined. The overall intensity correlates to a "bucket value" determination in that overall intensity value does not comprise spatial information. Instead, it correlates to the summation of the light intensity of a frame. In the case of a picture, the overall intensity correlates to the sum of the reflected illumination. In the case of an electronic display formed by pixels, the overall intensity is the summation each pixel value at each pixel location within a given frame. In the case of a picture, the overall intensity correlates to the sum of the reflected illumination. In the case of an electronic display formed by pixels, the overall intensity is the summation each pixel value at each pixel location within a given frame. In Box 313, the average overall intensity for all frames in the inputted (see Box 1) is computed. To determine the average overall intensity, the summation of the intensities for frames is divided by the number of frames. In Box 314 the overall intensity deviation for each frame is determined by subtracting the Average Overall Intensity from the Overall Intensity for each frame.

The method proceeds to FIG. 21. In Box 315, a series of frames are entered into the memory or input of a processor or image processor. The frames may comprise photographs of the same region of interest. The region of interest may be a scene, landscape, an object, a subject, person, or thing. These frames are the same frames used in Box 301 and may be reused if they are still available in the memory or input of the processor or image processor. In Box 316 the Average Frame Data is determined by computing the average value of each pixel at each pixel location for the plurality of frames. In Box 317 the Deviation Frame Data is determined by subtracting the Average Frame Data from the Frame Data for all pixels in each frame for the plurality of frames.

The method proceeds via path 800 to FIG. 22 which shows how to generate a third set of data which is referred to here at SET 3. SET 3 data includes conditional product terms using frames having a positive overall intensity deviation and positive deviation frame data pixels. SET 3 may be determined as follows: In Box 318 frames with a Positive Overall Intensity Deviation multiply the value of the Overall Intensity Deviation by the Positive Frame Data Deviation pixels within that set of frames. In Box 319 pixel locations (a), the square of the Positive Overall Intensity Deviation (b), the product of the Positive Overall Intensity Deviation×the Positive Deviation Frame Data pixels and the square of the Positive Deviation Frame Data pixels are recorded and accumulated. In Box 320 the pre-normalized Positive-Positive Product pixel values, 320(*a*), are determined by dividing the product of the Positive Overall Intensity Deviation×the Positive Deviation Frame Data Frame Data pixels by 319(*a*). The average of the squares of the Positive Overall Intensity is determined by dividing 319(*b*) by 319(*a*). The average of the squares of the Positive Deviation Frame Data pixels is determined by dividing 319 (*d*) by 319(*a*).

Figure 23:
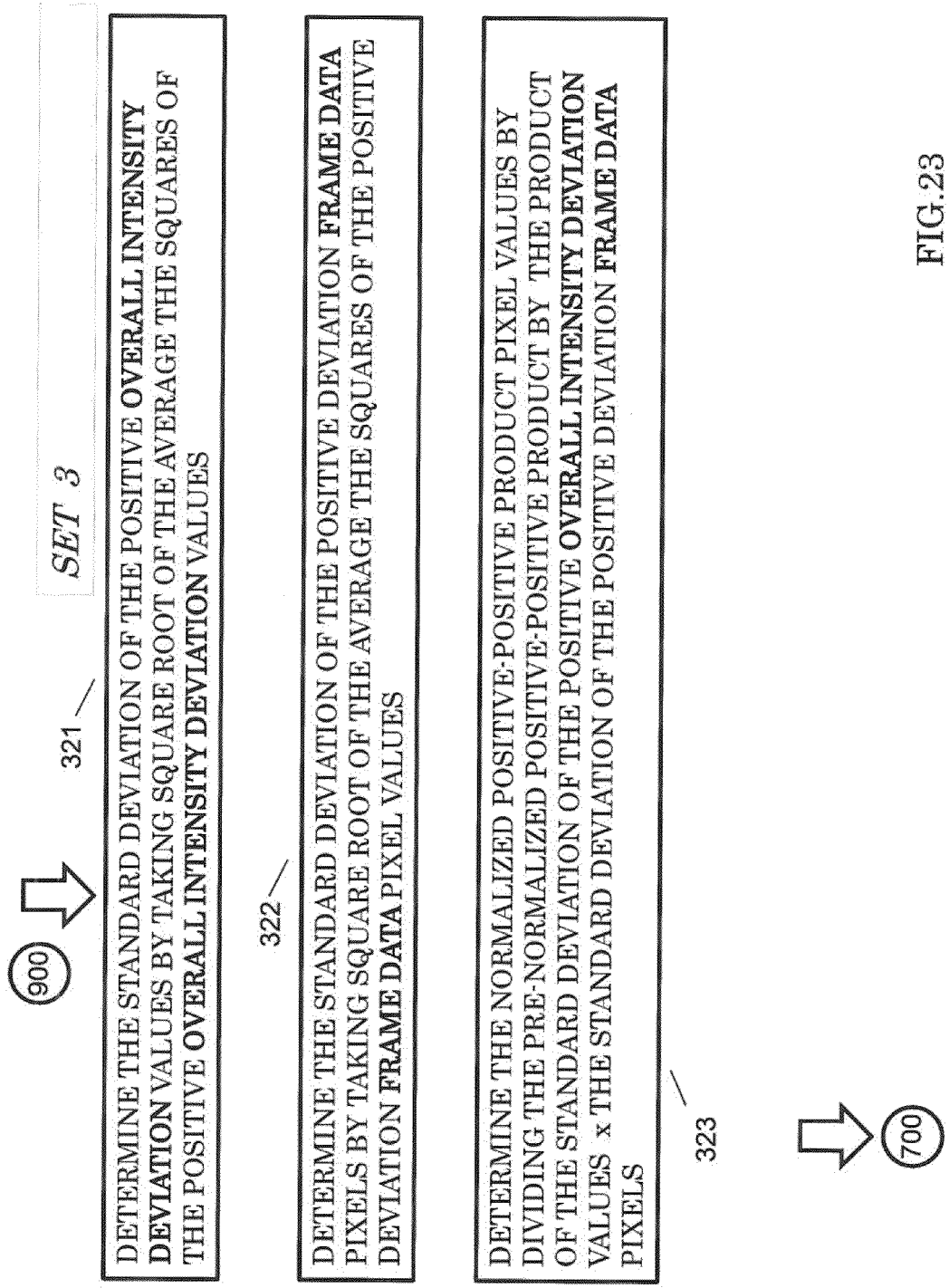
Figure 28:
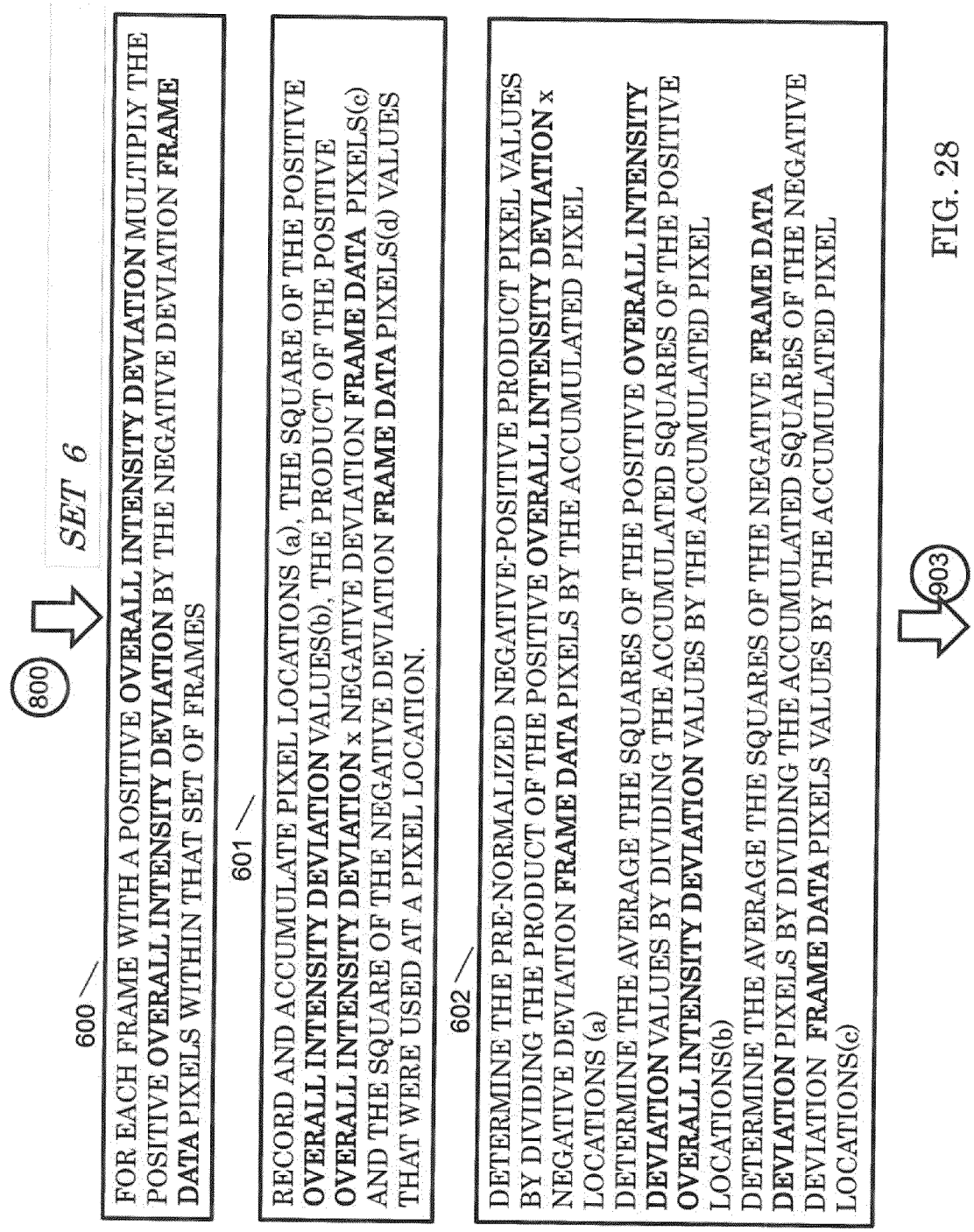

Continuing via path 900 to FIG. 28, the method proceeds to FIG. 23 In Box 321 the standard deviation of the Positive Overall Intensity Deviation is determined by taking the square root of the average of the squares of the Positive Overall Intensity Deviation, 320(*a*). In Box 322 the standard deviations of the Positive Deviation Frame Data pixels is computed by taking the square root of the average of the squares of the Positive Deviation Frame Data pixels, 320(*b*). Box 323 determines the Normalized Positive-Positive Product pixel values by dividing the pre-Normalized Positive-Positive Product, 320(*a*), by the product of the standard deviation of the Positive Overall Intensity Deviation, 321, and the standard deviation of the Positive Deviation Frame Data pixels, 322.

The method proceeds via path 800 to FIG. 24 which shows how to generate a fourth set of data which is referred to here at SET 4. SET 4 frame data includes conditional product terms using frames having a negative overall intensity deviation and negative deviation frame data pixels. SET 4 may be determined as follows: In Box 400 frames with a Negative Overall Intensity Deviation multiply the value of the Overall Intensity Deviation by the Negative Frame Data Deviation pixels within that set of frames. In Box 401 pixel locations (a), the square of the Negative Overall Intensity Deviation (b), the product of the Negative Overall Intensity Deviation×the Negative Deviation Frame Data pixels and the square of the Negative Deviation Frame Data pixels are recorded and accumulated. In Box 402 the pre-normalized Negative-Negative Product pixel values, 402(*a*), are determined by dividing the product of the Negative Overall Intensity Deviation×the Negative Deviation Frame Data Frame Data pixels by 401(*a*). The average of the squares of the Negative Overall Intensity is determined by dividing 401(*b*) by 401(*a*). The average of the squares of the Negative Deviation Frame Data pixels is determined by dividing 401(*d*) by 401(*a*).

From Box 402 in FIG. 24, the method can proceed via path 901 to FIG. 25. In Box 403 the standard deviation of the Negative Overall Intensity Deviation is determined by taking the square root of the average of the squares of the Negative Overall Intensity Deviation, 402(*a*). In Box 404 the standard deviations of the Negative Deviation Frame Data pixels is computed by taking the square root of the average of the squares of the Negative Deviation Frame Data pixels, 402(*b*). Box 405 determines the Normalized Negative-Negative Product pixel values by dividing the pre-Normalized Negative-Negative Product, 402(*a*), by the product of the standard deviation of the Negative Overall Intensity Deviation, 403, and the standard deviation of the Negative Deviation Frame Data pixels, 404. At the conclusion of Box 405, the method proceeds via path 700 to FIG. 30 for determining an improved image data 701, or to FIG. 31 for determining alternative improved image data 702 by an alternative embodiment.

Returning to FIG. 22, the method also can concurrently proceeds via path 800 to FIG. 26 which shows how to generate a fifth set of data which is referred to here at SET 5. SET 5 frame data includes conditional product terms using frames having a negative overall intensity deviation and positive deviation frame data pixels. SET 5 may be determined as follows: In Box 800 frames with a Negative Overall Intensity Deviation multiply the value of the Overall Intensity Deviation by the Positive Frame Data Deviation pixels within that set of frames. In Box 801 pixel locations (a), the square of the Negative Overall Intensity Deviation (b), the product of the Negative Overall Intensity Deviation×the Positive Deviation Frame Data pixels and the square of the Positive Deviation Frame Data pixels are recorded and accumulated. In Box 802 the pre-normalized Positive-Negative Product pixel values, 802(*a*), are determined by dividing the product of the Negative Overall Intensity Deviation×the Positive Deviation Frame Data Frame Data pixels by 801(*a*). The average of the squares of the Negative Overall Intensity is determined by dividing 801(*b*) by 801(*a*). The average of the squares of the Positive Deviation Frame Data pixels is determined by dividing 801(*d*) by 801(*a*).

From Box 802 in FIG. 26, the method can proceed via path 902 to FIG. 27. In Box 803 the standard deviation of the Negative Overall Intensity Deviation is determined by taking the square root of the average of the squares of the Negative Overall Intensity Deviation, 802(*a*). In Box 804 the standard deviations of the Positive Deviation Frame Data pixels is computed by taking the square root of the average of the squares of the Positive Deviation Frame Data pixels, 802(*b*). Box 805 determines the Normalized Positive-Negative Product pixel values by dividing the pre-Normalized Positive-Negative Product, 802(*a*), by the product of the standard deviation of the Negative Overall Intensity Deviation, 803, and the standard deviation of the Positive Deviation Frame Data pixels, 804.

Figure 30:
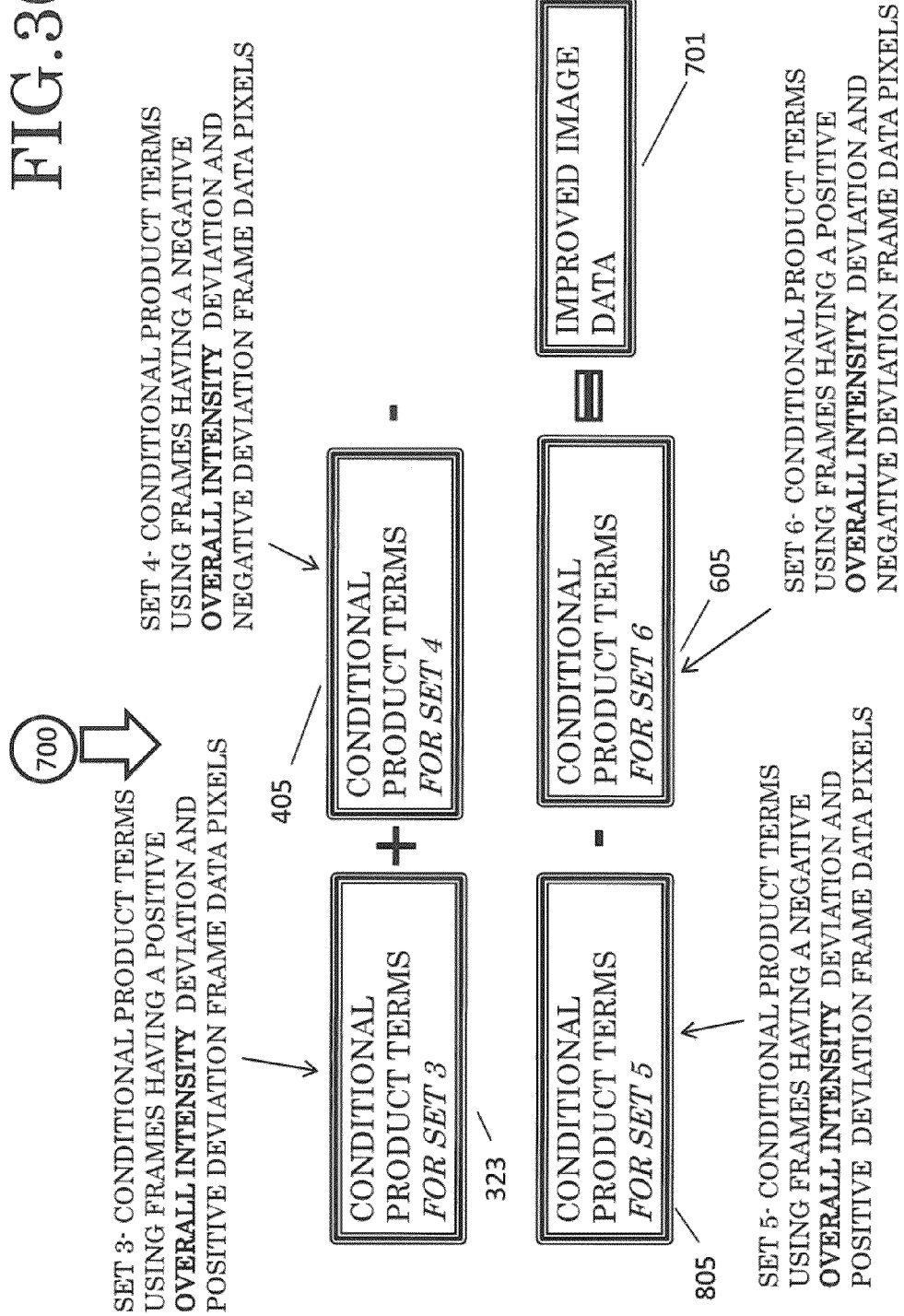
Figure 31:
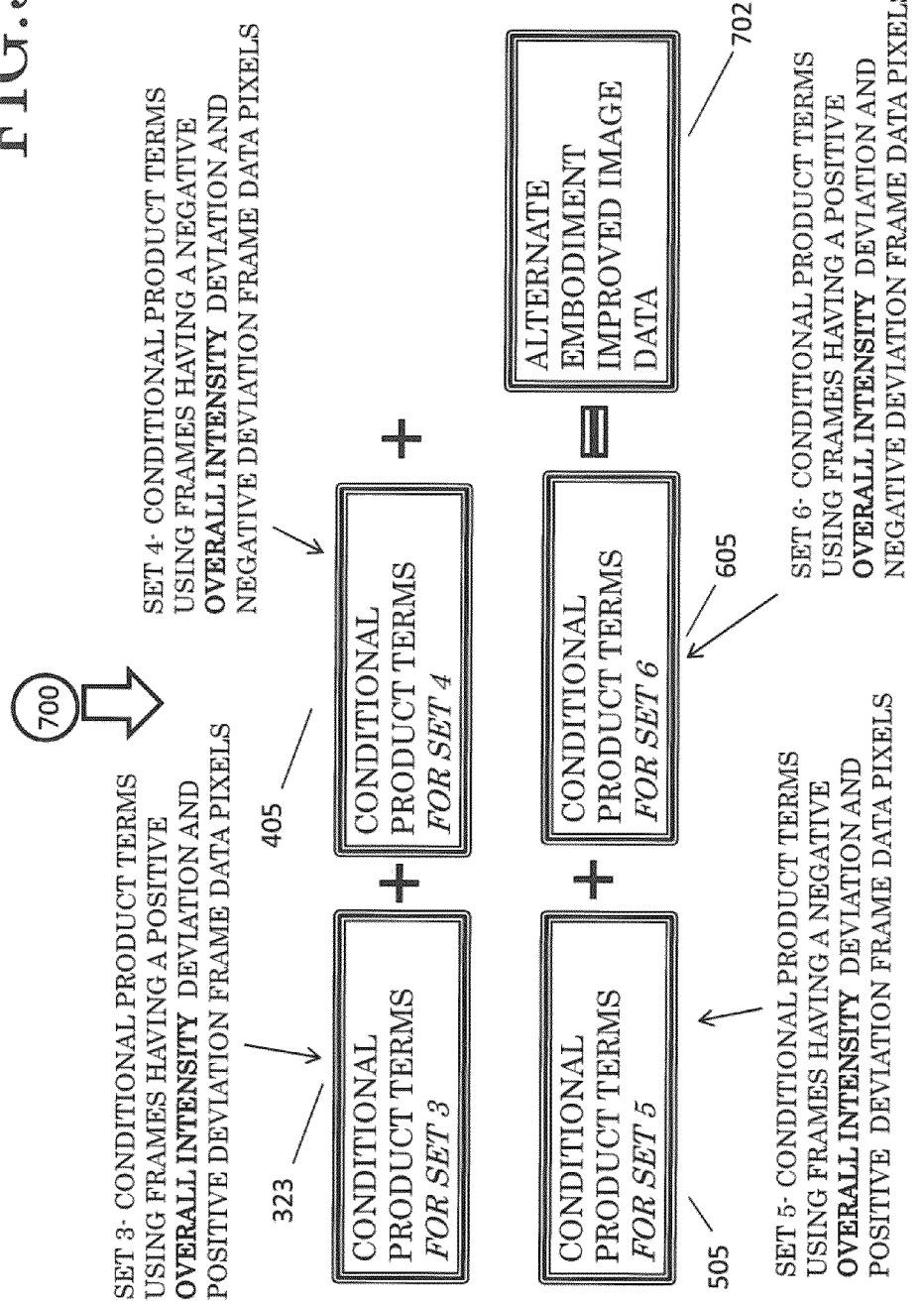

At the conclusion of Box 805 in FIG. 27, the method proceeds via path 700 to FIG. 30 for determining an improved image data 701, or to FIG. 31 for determining alternative improved image data 702 by an alternative embodiment.

Similar as discussed above with respect to the fifth set of data (SET 5), returning to FIG. 22, the method also can concurrently proceed via path 800 to FIG. 28 which shows how to generate a sixth set of data which is referred to here at SET 6. SET 6 frame data includes conditional product terms using frames having a positive overall intensity deviation and a negative deviation frame data pixels. SET 6 may be determined as follows: In Box 600 frames with a Positive Overall Intensity Deviation multiply the value of the Overall Intensity Deviation by the Negative Frame Data Deviation pixels within that set of frames. In Box 601 pixel locations (a), the square of the Positive Overall Intensity Deviation (b), the product of the Negative Overall Intensity Deviation×the Negative Deviation Frame Data pixels and the square of the Negative Deviation Frame Data pixels are recorded and accumulated. In Box 602 the pre-normalized Negative-Positive Product pixel values, 602(*a*), are determined by dividing the product of the Positive Overall Intensity Deviation×the Negative Deviation Frame Data Frame Data pixels by 601(*a*). The average of the squares of the Positive Overall Intensity is determined by dividing 601(*b*) by 601(*a*). The average of the squares of the Negative Deviation Frame Data pixels is determined by dividing 601(*d*) by 601(*a*).

From Box 602 in FIG. 28, the method can proceed via path 903 to FIG. 28. In Box 603 the standard deviation of the Positive Overall Intensity Deviation is determined by taking the square root of the average of the squares of the Positive Overall Intensity Deviation, 602(*a*). In Box 604 the standard deviations of the Negative Deviation Frame Data pixels is computed by taking the square root of the average of the squares of the Negative Deviation Frame Data pixels, 602(*b*). Box 605 determines the Normalized Negative-Positive Product pixel values by dividing the pre-Normalized Negative-Negative Product, 602(*a*), by the product of the standard deviation of the Positive Overall Intensity Deviation, 603, and the standard deviation of the Negative Deviation Frame Data pixels, 604.

Figure 29:
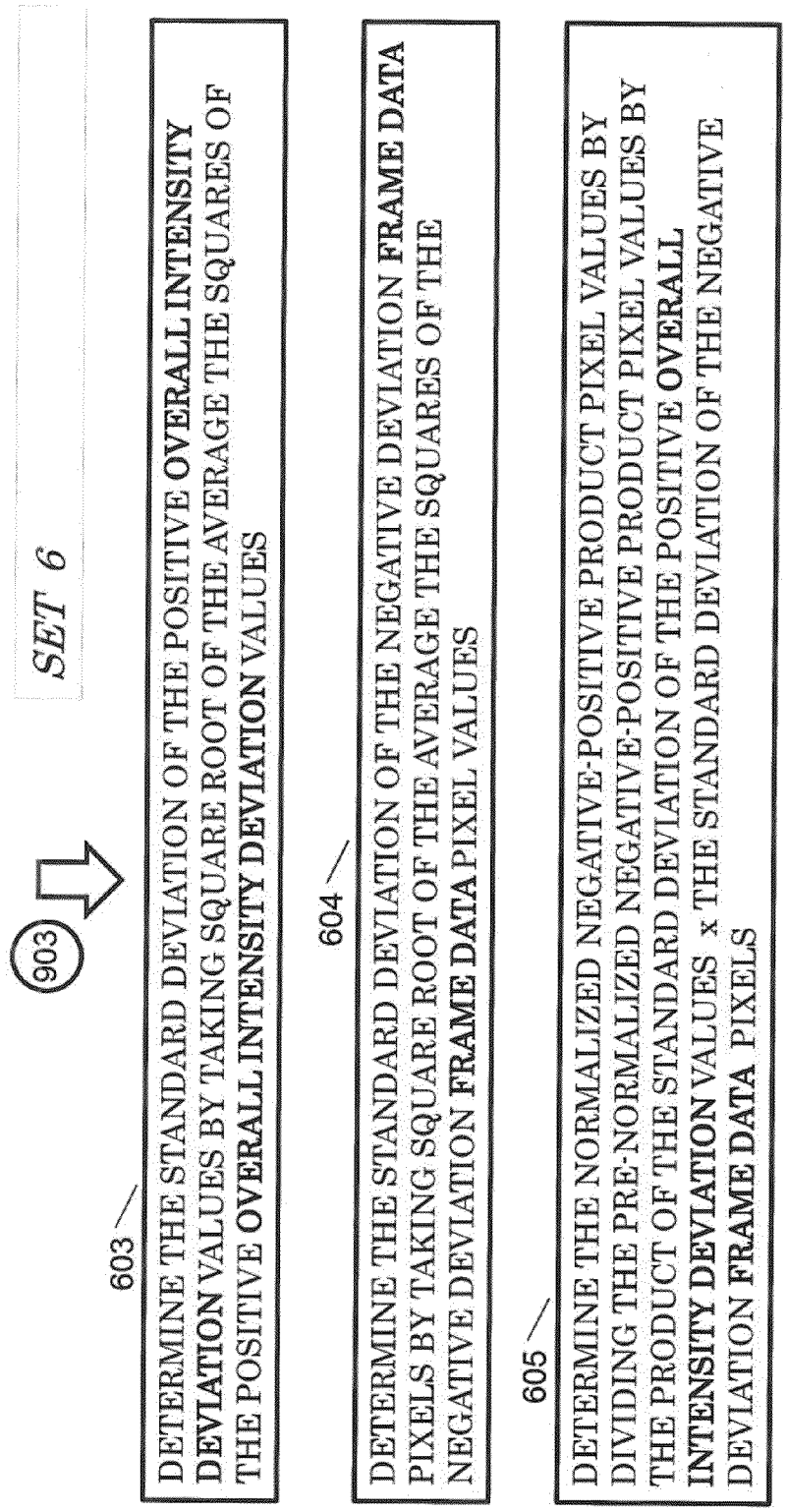

At the conclusion of Box 605 in FIG. 29, the method proceeds via path 700 to FIG. 30 for determining an improved image data 701, or to FIG. 31 for determining alternative improved image data 702 by an alternative embodiment.

FIG. 30 is a partial schematic block diagram illustration of the steps for performing an alternate preferred method of the present invention in which the improved final image is determined by adding the above-mean, above mean image to the below-mean, below-mean images, subtracting the above-mean, below-mean image, and subtracting the below-mean, above mean image. Here, improved image data 701 is determined by adding "SET 3" 323 to "SET 4" 405 and subtracting "SET 5" 505 and subtracting "SET 6" 605.

FIG. 31 is a partial schematic block diagram illustration of the steps for performing an alternate preferred method of the present invention in which the improved final image is determined by adding the above-mean, above mean image, the below-mean, below-mean image, the above-mean, below-mean image, and the below-mean, above mean image. Here, an alternate embodiment of improved image data 702 is determined by adding "SET 3" 323, "SET 4" 405, "SET 5" 805 and "SET 6" 605 together.

FIG. 32 is a result computed using Eq. 1 subject to the self-bucketing concept of Eq. 2. This result was from a few hundred shots taken of a typical scene using an infra-red camera. Some portions of the scene are partially visible such as the lamp post in the middle and the clouds (38.*a*) in the sky background. Other features such as the safety bars (38.*b*) and the tree line in the background (38.*c*) are not distinguishable.

With respect to FIGS. 31-32, SETs 3-6 are arbitrarily named, following the reference to SETs 1 and 2, described above. However, it should be appreciated that SETs 3-6 are distinct and separate from SETs 1 and 2 used in the previously discussed embodiments. In fact, SETs 3-6 could have renumbered SETs 1-4 corresponding to first, second, third and fourth data sets.

FIG. 33 is a result computed using the same data from FIG. 32 but applying the inventive procedure described in which the $R_m$ conditional product terms were combined with $R_m^{++}+R_m^{--}-R_m^{+-}-R_m^{-+}$ to produce the improved image. The superscripts indicate a positive or negative deviation for the conditional product terms. In comparison with FIG. 32., the safety bars on the right of the image are now very distinct (39.b) and the edges of the clouds (39.a) are more sharply defined. Furthermore, in the distance a tree line (39.c) has been resolved by the applications of the method described herein.

FIG. 34 is a result computed using the same data from FIG. 38 but applying the inventive procedure described in which the $R_m$ conditional product terms were combined with $R_m^{++}+R_m^{--}+R_m^{+-}+R_m^{-+}$ to produce the improved image. The superscripts indicate a positive or negative deviation for the conditional product terms. In comparison with FIG. 38., the safety bars (40.b) on the right of the image are distinct, the edges of the clouds (40.a) are more sharply defined, and the distant tree line is resolved (40.c). A comparison between the (a), (b), and (c) features of FIG. 33 shows some apparent relative smoothing and a bit less contrast in FIG. 34.

FIG. 35 is a set of experimental results computed using a simple average of the collected frame data (a); A baseline result computed using Eq. 1 subject to the self bucketing concept of Eq. 2 (b); and two improved images when applying the partitioning procedure shown in FIG. 21 et seq. Both the Log positive (d) and negative (c) components of the base G(2) image show increased contrast and sharpening of edges. In particular, a comparison between (a1) on the average image and (c1) and (d1) of the improved log negative and log positive images highlights that the number "6" is quite legible in the improved images. A comparison of the (b2), (c2) and (d2) regions highlights the increased contrast of the (c2) and (d2) area with respect to the baseline (b) image.

FIG. 36 presents improved image results using a few hundred shots taken of a typical scene using an infra-red camera. Some portions of the scene are partially visible such as the lamp post in the middle and the clouds in the sky background. The improved image was computed combining the methods shown in FIG. 30. Features such as the lamp post show much more contrast and edge clarity. It should be noted that the process described in FIG. 36 yields all positive results with background noise largely eliminated.

FIG. 37 is an illustration of a log—negative values of $G^{(2)}$ improved image result generated using the procedure shown in FIG. 21 et seq. This image exhibits phase information about the target region. Images with phase information often provide very high contrast. The dark and light parts of FIG. 37 are nearly opposite to the same areas in FIG. 38.

FIG. 38 is an illustration of a log positive values of a $G^{(2)}$ improved image result generated using the processes shown in FIG. 21 et seq. This image exhibits phase information about the target region. Images with phase information often provide very high contrast. The dark and light parts of FIG. 38 are nearly opposite to the same areas in FIG. 39.

FIG. 39 is an illustration of results using a standard $G^{(2)}$ calculation using Eq. 1 and the self bucketing concept of Eq. 2 to provide a baseline to compare with the improved imaging results presented in FIGS. 37 and 38. Very faint indications of phase information are present in this figure are greatly enhanced in FIG. 37 and FIG. 38.

Potential Applications

The potential extent of possible use of this invention is described in the following. However, this description should not be construed as limited to the statements. Potential applications include high resolution imaging, remote sensing, microscopic sensing, phase-contrast imaging or microscopy, astronomical imaging, physics, chemistry, biology, medical applications, quality control, surveillance, surface tampering detection, imaging partially occluded scenes, spectroscopy, identification of hidden or concealed objects, remote biometrics, design of new sensors and image processing methods, design of new types of stealth technology, design of new types of communications devices.

Speed Traffic Enforcement

Current local governments use traffic enforcement cameras to enforce traffic regulation violations. A traffic enforcement camera (also road safety camera, road rule camera, photo radar, speed camera, Gatso™) is an automated ticketing machine. It may include a camera which may be mounted besides, on, or over a highway or installed in an enforcement vehicle to detect traffic regulation violations, including speeding, vehicles going through a red traffic light, unauthorized use of a bus lane, for recording vehicles inside a congestion charge area and others. The latest automatic number plate recognition (ANPR) systems can be used for the detection of average speeds and use optical character recognition on images to read the license plates on vehicles. There are a number of possible factors that affect the ANPR software performance. One of these important factors is poor image resolution, usually because the plate is too far away but sometimes resulting from the use of a low-quality camera. In the case of camera recording a video (a sequence of images), this invention can process the recorded images to improve image quality of the license plate on vehicle. The enhanced license plate images are used to improve the performance of ANPR software. The invention is especially useful when the images are acquired from a far away distance and/or from a low-quality camera.

The invention may be utilized in conjunction with large crowd event security and management. Events involving a large crowd, especially the types of events including circuses, sporting events, theatrical events, concerts, rallies, parades, etc., the security task is to prevent, where possible, crimes including theft, vandalism or assault through the deployment of trained and licensed security personnel. Camera monitoring is an important component in this type of event security and management. The invention can be used to improve image details of a human face, nomenclature on a jersey, or a moving object/vehicle, etc., from a distance, or from the periphery of the event location. Also at football games, a preferred embodiment could be used to enhance the readability of numbers and/or names on football uniforms.

As used herein, the terminology "subject" means: an area, a scene, an object or objects, a landscape, overhead view of land or an object or objects, or a combination thereof.

As used herein, the terminology "frame" means: a picture, an image or one of the successive pictures on a strip of film or video.

As used herein, the terminology "process" means an algorithm, software, subroutine, computer program, or methodology.

As used herein, the terminology "algorithm" means: sequence of steps using computer software, process, software, subroutine, computer program, or methodology.

As used herein, the terminology "image sensor" means: a camera, bucket detector, CMOS, SPAD, quantum well, LIDAR, LADAR, charge coupled device (CCD), video device, spatial sensor, or range sensor. The image sensor may comprise a device having a shutter controlled aperture that, when opened, admits light enabling an object to be focused, usually by means of a lens, onto a surface, thereby producing a photographic image OR a device in which the picture is formed before it is changed into electric impulses.

The terminology "processor" or "image processor" as used in the following claims includes a computer, multiprocessor, CPU, minicomputer, microprocessor or any machine similar to a computer or processor which is capable of processing algorithms.

The terminology "operations" as used in the following claims includes steps, a series of operations, actions, processes, subprocesses, acts, functions, and/or subroutines.

As used herein the terminology "succession" means the act or process of following in order or sequence, but is not limited to sequential order. As used herein the terminology "succession" refers to a later taken image being compared with an earlier taken image.

As used herein the terminology "array" refers to a systematic arrangement of data in rows and columns. An example of an array is a matrix which is a rectangular array of numbers, symbols, or expressions. Examples of arrays include a matrix which is a rectangular array of numbers, symbols, or expressions and a vector which is a linear array of numbers, symbols or expressions.

As used herein, the terminology "phase" refers to a property of waves that measures the advance of one wave relative to another wave or that wave at an earlier place in space-time. Quantum particles such as photons having some wave properties may exhibit phase properties. Phase differences may be manifest as interference or diffraction fringes. Since images are the result of interaction of quantum particles with reflective or scattering objects they can exhibit interference fringes as signatures of instantaneous or average phase variations. Often objects that exhibit some fringes can be referred to as phase objects. "Phase information" refers to images that provide indications such as interference or diffraction fringes induced by the target and its environment. Phase information can be useful to distinguish features of the target that are generally not as recognizable without the phase information. Phase is discussed in R. E. Meyers, K. S. Deacon, and Y. H. Shih, "Turbulence-free ghost imaging," App. Phys. Lett. 98, 111115 (2011), R. E. Meyers, K. S. Deacon, and Y. H. Shih, "Positive-negative turbulence-free ghost imaging," Appl. Phys. Lett. 100, 131114 (2012). As used herein the terminology, "SPAD" refers to an array of Single Photon Counting Detectors that is used for imaging.

As used herein the terminology, "synchronous" means data or frames that are acquired at the time or are time coincident.

As used herein the terminology, "asynchronous" means data or frames that are not acquired at the same time or are not time coincident.

As used herein the terminology, "light" is meant to describe electro-magnetic energy of any portion of the electro-magnetic spectrum to include, but not limited to, cosmic rays, x-rays, ultra-violet, visible, infra red, terahertz, microwave, and radio waves. Light may be measured in terms of its photons or fields.

Although various preferred embodiments of the present invention have been described herein in detail to provide for complete and clear disclosure, it will be appreciated by those skilled in the art that variations may be made thereto without departing from the spirit of the invention.

It should be emphasized that the above-described embodiments are merely possible examples of implementations. Many variations and modifications may be made to the above-described embodiments. All such modifications and variations are intended to be included herein within the scope of the disclosure and protected by the following claims. The invention has been described in detail with particular reference to certain preferred embodiments thereof, but it will be understood that variations and modifications can be effected within the spirit and scope of the invention. All references mentioned herein are hereby incorporated by reference herein.

What is claimed is:

1. A method for image improvement comprising
   providing a series of frames of a given region of interest;
   determining the value of each pixel within each frame to form a first array of pixel values;
   determining the integral of pixel values of each frame to form a second array of overall frame integrals;
   partitioning the first array into two sets based on a predetermined criteria;
   partitioning the second array into two sets based on a predetermined criteria;
   using the first and second sets of the first and second arrays to compute a conditional product term for each of the four combinations of the first and second sets of the first and second arrays; and
   combining the conditional product terms to provide an improved image of the region of interest.

2. The method of claim 1, wherein the frames inputted were influenced by the effects of turbulence, obscurants, or were taken during inclement or changing weather conditions.

3. The method of claim 1, wherein the predetermined criteria for the first array are values above and below the average of the first array over all frames and where the predetermined criteria for the second array are values above and below the average of the second array over all frames of data.

4. The method of claim 3, wherein in the improved image is produced by adding the product of the above average values of the first array and the above average values of the second array to the product of the below average values of the first array and the below average values of the second array, subtracting the product of the above average values of the first array and the below average values of the second array, and subtracting the product of the below average values of the first array and the above average values of the second array.

5. The method of claim 3, wherein in the improved image is produced by adding the product of the above average values of the first array and the above average values of the second array to the product of the below average values of the first array and the below average values of the second array, adding the product of the above average values of the first array and the below average values of the second array, and adding the product of the below average values of the first array and the above average values of the second array.

6. The method of claim 1, wherein the predetermined criteria for the first array is the light polarization of the first array over all frames of data and where the predetermined criteria for the second array is the light polarization of the second array over all frames of data.

7. The method of claim 1, wherein the elements of the first and seconds sets of the first and second arrays are time or frame asynchronous.

8. The method of claim 1, wherein the resultant conditional product terms to include the final combined improved image is partition into positive elements and negative elements and further operated upon using functions including but not limited to logarithms, square roots, and exponents to further increase image contrast and image quality.

9. The method of claim 1, wherein the processes produces phase information of the target.

10. The method of claim 1, wherein the conditional product terms are computed using a compressive/sparse technique.

11. The method of claim 1, wherein the step of determining the overall intensity of each frame comprises adding together the values for the pixels.

12. The method of claim 1 wherein the step of determining the integral of pixel values of each frame comprises illuminating a target and determining the amount of light reflected from the target by detecting the reflected illumination using at least one image detector.

13. A method for image improvement comprising:
providing a series of frames of a given region of interest;
determining the value of each pixel at each location within each frame to form a first array of pixel values for each frame;
determining the overall intensity of each frame;
determining the product of the overall intensity and the array of pixel values for each frame;
determining the sum of the products by adding together the products of the overall frame intensity and first array of pixel values for each frame;
determining the average of the sum of products by dividing the sum of products by the number of frames in the series of frames;
determining the average value of each pixel at each pixel location for the series of frames to form a second array of average pixel values;
determining the average overall frame intensity for the series of frames;
determining a second product of the second array of average pixel values and the average overall frame intensity;
subtracting the second product from the first product to provide an improved image of the region of interest;
partitioning the improved image into at least two partitions based on a predetermined criteria;
mathematically operating upon the partitioned improved image to increase image contrast or image clarity.

14. The method of claim 13, wherein the improved images of the region of interest is reconstructed using sparse data from a plurality of image frames.

15. A system for image improvement comprising:
at least one processor, and
at least one memory operatively associated with the at least one processor for the storage of frames of data taken of a region of interest, each frame of data comprising an array of pixels, each frame having a frame integral correlating to the sum of the pixel values for each frame;
the at least one processor configured to execute the method of claim 1.

16. A system for image improvement comprising:
at least one processor;
at least one memory operatively associated with the at least one processor, the at least one processor configured to execute the method of claim 13.

17. The system of claim 16, wherein the frames of data are input to the at least one processor, the frames of data comprising scanned images and wherein the frame intensity of each image is determined by illuminating the scanned image and determining the amount of light reflected from the image using at least one image sensor.

18. The system of claim 16, wherein the series of frames of a given region of interest comprises frames of data wherein the image of the region of interest has been distorted by the effects of turbulence or weather such that each frame contains one or more distorted features, the system operating to reduce or eliminate the distortion in the images to create an image having greater clarity.

19. The system of claim 18, wherein the distortion is reduced by using the overall intensity of the pixel values to utilize the effects of the quantum properties of light.

20. The method of claim 1 wherein the step of determining the integral of pixel values of each frame comprises determining the amount of light from the target by detecting the emanating illumination from the target using at least one detector; the at least one detector comprises a camera, bucket detector, CMOS, SPAD, quantum well, LIDAR, LADAR or a charge coupled device.

* * * * *

UNITED STATES PATENT AND TRADEMARK OFFICE
CERTIFICATE OF CORRECTION

PATENT NO.        : 8,594,455 B2
APPLICATION NO.   : 13/838249
DATED             : November 26, 2013
INVENTOR(S)       : Ronald E. Meyers and Keith S. Deacon Page 1 of 1

It is certified that error appears in the above-identified patent and that said Letters Patent is hereby corrected as shown below:

In the Specification

In Col. 16, line 56, replace "38.a" with --32.a--;
line 57, replace "38.b" with --32.b--;
line 58, replace "38.c" with --32.c--.
In Col. 17, line 6, replace "39.b" with --33.b--;
line 6, replace "39.a" with --33.a--;
line 7, replace "39.c" with --33.c--;
line 11, replace "38" with --32--;
line 15, replace "38" with --32--;
line 16, replace "40.b" with --34.b--;
line 17, replace "40.a" with --34.a--;
line 18, replace "40.c" with --34.c--.

Signed and Sealed this
Seventeenth Day of June, 2014

Michelle K. Lee
*Deputy Director of the United States Patent and Trademark Office*